(12) United States Patent
Ross

(10) Patent No.: US 7,143,722 B2
(45) Date of Patent: Dec. 5, 2006

(54) ELECTROLYSIS CELL AND INTERNAL COMBUSTION ENGINE KIT COMPRISING THE SAME

(75) Inventor: Bill Ross, Newmarket (CA)

(73) Assignee: Canadian Hydrogen Energy Company, Bowmanville (CA)

(*) Notice: Subject to any disclaimer, the term of this patent is extended or adjusted under 35 U.S.C. 154(b) by 0 days.

(21) Appl. No.: 11/055,139

(22) Filed: Feb. 8, 2005

(65) Prior Publication Data

US 2005/0199509 A1    Sep. 15, 2005

Related U.S. Application Data

(63) Continuation of application No. 10/162,367, filed on Jun. 3, 2002, now Pat. No. 6,896,789.

(30) Foreign Application Priority Data

Jun. 4, 2001   (CA) ................................. 2349508

(51) Int. Cl.
   *F02B 43/08* (2006.01)
(52) U.S. Cl. .................. 123/3; 123/DIG. 12
(58) Field of Classification Search .......... 123/3, 123/DIG. 12
   See application file for complete search history.

(56) References Cited

U.S. PATENT DOCUMENTS

| | | | |
|---|---|---|---|
| 2,365,330 A | 12/1944 | Carmichael | 204/275 |
| 2,373,032 A | 4/1945 | Klein | 204/278 |
| 2,509,498 A | 5/1950 | Heyl | 123/119 |
| 2,565,068 A | 8/1951 | Drabold | 123/119 |
| 3,648,668 A | 3/1972 | Pacheco | 123/3 |
| 3,939,806 A | 2/1976 | Bradley | 123/3 |
| 3,980,053 A | 9/1976 | Horvath | 123/3 |
| 4,003,204 A | 1/1977 | Bradley | 60/618 |
| 4,023,545 A | 5/1977 | Mosher et al. | 123/119 |
| 4,031,865 A | 6/1977 | Dufour | 123/1 |
| 4,035,255 A | 7/1977 | Gritzner | 205/516 |
| 4,053,683 A | 10/1977 | Rounds | 429/8 |
| 4,054,423 A | 10/1977 | Blenman | 48/2 |
| 4,085,709 A | 4/1978 | Tangri | 123/1 A |
| 4,090,485 A | 5/1978 | LaCreta | 123/522 |
| 4,099,489 A | 7/1978 | Bradley | 123/3 |
| 4,111,160 A | 9/1978 | Talenti | 123/1 |
| 4,140,090 A | 2/1979 | Lindberg | 123/75 |
| 4,180,445 A | 12/1979 | Bennett et al. | 204/129 |
| 4,263,112 A | 4/1981 | Aylward | 204/129 |
| 4,271,793 A | 6/1981 | Valdespino | 123/3 |

(Continued)

FOREIGN PATENT DOCUMENTS

CA            732594        4/1966

(Continued)

OTHER PUBLICATIONS

Nidola, A., "WAter Electrolysis in Alkaline Solutions New Electrode Materials", *Int. J. Hydrogen Energy*, vol. 9, No. 5, pp. 367-375, 1984.

*Primary Examiner*—Noah P. Kamen
(74) *Attorney, Agent, or Firm*—Vidas, Arrett & Steinkraus PA

(57) ABSTRACT

A system for producing one or more gases for enhancing combustion in an internal combustion engine, the engine having an intake, the system comprising: an electrolysis cell, for generating one or more combustion enhancing gases under pressure; a gas conduit, for connecting the electrolysis cell to the internal combustion engine; and a flow regulator, operatively connected between the electrolysis cell and the intake of the engine, for regulating a flow of the combustion enhancing gases to the engine.

28 Claims, 5 Drawing Sheets

U.S. PATENT DOCUMENTS

| | | | |
|---|---|---|---|
| 4,332,219 A | 6/1982 | Gonzalez | 123/3 |
| 4,344,831 A | 8/1982 | Weber | 204/228 |
| 4,368,696 A | 1/1983 | Reinhardt | 123/3 |
| 4,369,737 A | 1/1983 | Sanders et al. | 123/3 |
| 4,382,845 A | 5/1983 | Hubred | 204/111 |
| 4,382,849 A | 5/1983 | Spicer | 204/258 |
| 4,442,801 A | 4/1984 | Glynn et al. | 123/3 |
| 4,474,612 A | 10/1984 | Lohrberg | 204/252 |
| 4,595,477 A | 6/1986 | Detournay et al. | 204/253 |
| 4,620,915 A | 11/1986 | Ohlin | 204/284 |
| 4,702,894 A | 10/1987 | Cornish | 422/186.26 |
| 4,753,718 A | 6/1988 | Chiang | 204/265 |
| 4,763,610 A | 8/1988 | Thomas | 123/3 |
| 4,773,981 A | 9/1988 | Bidwell | 204/266 |
| 4,774,810 A * | 10/1988 | Bidwell | 60/605.1 |
| 4,875,988 A | 10/1989 | Aragon | 204/265 |
| 5,082,544 A | 1/1992 | Willey et al. | 204/270 |
| 5,105,773 A | 4/1992 | Cunningham et al. | 123/3 |
| 5,119,768 A | 6/1992 | Russell | 123/1 A |
| 5,143,025 A | 9/1992 | Munday | 123/3 |
| 5,178,118 A | 1/1993 | Nakamats | 123/525 |
| 5,196,104 A | 3/1993 | Munday | 204/258 |
| 5,231,954 A | 8/1993 | Stowe | 123/3 |
| 5,293,857 A | 3/1994 | Meyer | 123/571 |
| 5,305,715 A | 4/1994 | Nissley | 123/3 |
| 5,399,251 A | 3/1995 | Nakamats | 204/262 |
| 5,450,822 A | 9/1995 | Cunningham | 123/3 |
| 5,452,688 A | 9/1995 | Rose | 123/3 |
| 5,458,095 A | 10/1995 | Post et al. | 123/3 |
| 5,513,600 A | 5/1996 | Teves | 123/3 |
| 5,711,865 A | 1/1998 | Caesar | 205/628 |
| 5,824,202 A | 10/1998 | Fabian et al. | 204/284 |
| 6,126,794 A | 10/2000 | Chambers | 204/230.5 |
| 6,155,212 A | 12/2000 | McAlister | 123/3 |
| 6,209,493 B1 | 4/2001 | Ross | 123/3 |
| 6,257,175 B1 | 7/2001 | Mosher et al. | 123/3 |
| 6,311,648 B1 | 11/2001 | Larocque | 123/3 |
| 6,332,434 B1 | 12/2001 | De Souza et al. | 123/3 |
| 6,336,430 B1 | 1/2002 | de Souza et al. | 123/3 |
| 2001/0003276 A1 | 6/2001 | De Souza | 123/3 |

FOREIGN PATENT DOCUMENTS

| | | |
|---|---|---|
| CA | 1053606 | 5/1979 |
| CA | 1072492 | 2/1980 |
| CA | 1077436 | 5/1980 |
| CA | 1092546 | 12/1980 |
| CA | 1098482 | 3/1981 |
| CA | 1098485 | 3/1981 |
| CA | 1141880 | 2/1983 |
| CA | 1170308 | 7/1984 |
| CA | 1 189 886 | 7/1985 |
| CA | 1 234 774 | 4/1988 |
| CA | 1 236 424 | 5/1988 |
| CA | 1 272 647 | 8/1990 |
| CA | 1289506 | 9/1991 |
| CA | 2141880 | 2/1994 |
| CA | 2184995 | 9/1995 |
| CA | 2229694 | 8/1999 |
| CA | 2244022 | 1/2000 |
| CA | 2278917 | 1/2000 |
| DE | 40 37 541 A1 | 6/1991 |
| EP | 0 122 472 A2 | 10/1984 |
| EP | 0 405 919 A1 | 1/1991 |
| JP | 52-027919 | 3/1977 |
| JP | 58-107815 | 6/1983 |
| JP | 58-155261 | 9/1983 |
| WO | 00/06875 | 2/2000 |

* cited by examiner

ELECTROLYSIS CELL AND INTERNAL COMBUSTION ENGINE KIT COMPRISING THE SAME

CROSS-REFERENCE TO RELATED APPLICATIONS

This application is a Continuation application from application Ser. No. 10/162,367, filed Jun. 3, 2002, now U.S. Pat. No. 6,896,789, with claims priority from Canadian patent application No. 2,349,508, filed Jun. 4, 2001, the contents of which are hereby incorporated by reference.

FIELD OF THE INVENTION

This invention relates to the general field of combustion engines, and more particularly to an electrolysis cell for supplying gaseous fuel additives to enhance combustion in a combustion engine.

BACKGROUND OF THE INVENTION

Modern gasoline and diesel engines are more efficient and less polluting than similar engines of even a few years ago. However, due to the increased total number of vehicles in use, levels of air pollution continue to rise even in light of more efficient and clean running vehicles. Therefore, there has been increasing pressure to develop vehicles which have lower emissions, and thus are less polluting than conventional automotive technology permits. This has spurred development of alternate fuel technologies such as electric cars and vans, natural gas and propane fuelled vehicles, hydrogen cell vehicles and the like. While a number of these technologies are promising, some are still a long way from commercial implementation, and others appear to have reached the limit of present design capabilities without yielding a consumer acceptable product. Therefore, attention has refocused on conventional gas and diesel burning engines, and ways to render them more pollution free and efficient.

It is well known that the addition of hydrogen and oxygen gases as fuel increases the efficiency of an internal combustion engine and reduces pollution considerably. Both advantages appear to be the byproduct of faster flame speed that is as much as nine times that of gasoline, resulting in more complete combustion of the fuel in the combustion chamber. The amount of soot (semi-burnt hydrocarbons), nitrous oxide, carbon monoxide, and other pollutants is accordingly reduced, while output energy increases, for a greater fuel efficiency and horsepower.

One way to adopt hydrogen and oxygen as a fuel additive is to store the gases in tanks installed on a vehicle, with hoses connecting the tanks to the engine. However, tank storage of these volatile gases presents a persistent safety hazard, since there is always a risk of gas leak and explosion. It also requires regular trips to a service station for replenishment, which is inconvenient. Further, the prevailing service station network would need to be retrofitted at great cost to supply these gases, which would also require widespread coordination of standards that could unduly delay acceptance of the technology. As a result of these problems with tank storage, various attempts have been made to develop systems in which the gases could be generated on board the vehicle itself, using well-known technologies such as electrolysis, for use by the engine as needed.

An example of such a system is taught in U.S. Pat. No. 3,939,806 to Bradley. This system is quite complicated however since it includes a mechanism to generate DC current to power the electrolysis cell. This requires a working fluid such as water or freon and accompanying circulation system, a turbine and DC generator, a hydrogen carburetor and hydrogen storage tank, and several pumps to move the working fluid, water, and hydrogen. Implementing such a complicated system would be costly, require extensive effort to integrate with existing engines, and likely involve significant maintenance due to the many additional components. Further, Bradley does not even address the risk of an explosion, particularly from the hydrogen tank, or provide any means to keep the system running in cold weather, when the water that supplies the electrolysis cell would be frozen.

U.S. Pat. No. 5,231,954 to Stowe attempts to provide a simpler electrolysis system for generating hydrogen and oxygen gases on board a vehicle. The device is a single electrolysis chamber or cell that receives power directly from the vehicle battery, and has a gas-out line that connects with the positive crankcase ventilation (PCV) system of the engine. When the engine is running a vacuum is created in the PCV line which is used to draw the gases out of the cell and into the engine. There is also an air intake adjustment valve that is always open to the atmosphere. This valve is adjusted to mix air with the generated gases so as to meet emission control regulations. The operator adds electrolyte concentrate to water in the cell until a reading of 1.5–3.0 amperes is obtained. Thereafter, water is to be added manually to the cell about every 1000 miles. The cell has a friction-fit cap that secures tightly when exposed to the PCV line vacuum, and that loosens when the engine and associated vacuum is turned off. The loose cap is intended to pop off to provide relief from high pressure build-up in the cell when the engine is turned off.

Since the Stowe device receives power directly from the battery, the current level is set by adjusting the electrolyte concentration. The result is a high resistance, low current cell that generates excessive heat, which is problematic. The heat problem is exacerbated by the plastic walls used in the preferred embodiment, since plastic does not conduct heat well, and by the fact that no cooling mechanism is taught.

Further, while the device proposed aims to be simple to install and use, pre-mixing and pre-charging of the electrolyte is awkward, particularly for consumer use. Another complicating feature is that the air intake valve requires adjustment by emission control mechanics. Further, since this valve is always open to the atmosphere, it will likely draw dirty air into the cell. Stowe also teaches that this valve has a dual purpose in that it acts as a safety release valve if cell pressure rises. However it is not clear how an opening sized to meet emission requirements (likely a small opening) will also function effectively in a totally different context as a safety release. Therefore the Stowe device may lack sufficient safety release features to reduce the risk of explosion when there is a rise in pressure.

Yet another issue is that the PCV vacuum line required to operate the device is available with gasoline, but not diesel, internal combustion engines. Further, water replenishment is estimated at about every 1000 miles of driving. While this may be adequate for consumer use, it would require inconveniently frequent replenishment by commercial vehicle drivers who may drive that distance every few days. Therefore, the Stowe device would not be suitable for use by most commercial vehicles, particulary the large diesel trucks which produce a high proportion of pollution.

Another electrolysis device is shown in U.S. Pat. No. 4,271,793 to Valdespino. This patent teaches that the battery associated with most vehicle engines does not provide enough current to produce meaningful amounts of hydrogen and oxygen gases, and accordingly requires that a larger or second alternator be installed. However, this arrangement increases the amount of heat generated, which in turn requires installation of a separate water jacket supplied by the vehicle cooling system. These additional components add cost and complicate integration of the device with conventional engines.

The high level of generated heat presents a risk of boil-off of the electrolyte. To deal with this issue Valdespino places a valve in the output gas line to maintain a high cell internal pressure. The preferred pressure range is 50–150 psi, typically 100 psi. However, maintaining such high internal pressure generally increases the risk of an explosion and makes routine re-fill of the electrolyte a more complicated and risky procedure. It also compels the cell walls to be thicker than otherwise, adding to the weight of the cell. The gas output from the cell passes through an accumulator and from there is delivered to the intake manifold of the engine under a vacuum.

Unless these and other practical problems associated with this technology are resolved, the improved efficiency and reduced pollution benefits possible from using hydrogen and oxygen as a fuel additive will fail to be realized.

SUMMARY OF THE INVENTION

What is required is an electrolysis cell and internal combustion engine kit which overcomes the problems associated with the current devices used to generate hydrogen and oxygen gases as a fuel additive for combustion engines.

Most particularly, the device should produce hydrogen and oxygen gas in sufficient quantity to improve the combustion efficiency of the internal combustion engine to which it is connected. The device should deliver the generated gases effectively and consistently to the engine, so that the benefits of the gases as a fuel additive are realized. Preferably, the device will work with different types of engines, and particularly with turbocharged diesel engines typically used by commercial trucks that are heavy users of fuel. It would be advantageous if it could provide the gas throughout the duration of a trip without disruption, and in any weather condition which the vehicle may be expected to encounter, including both freezing winter and hot summer temperatures.

The device should be simple to operate, requiring minimal operator attention and maintenance. Preferably, the device should require little more than an occasional water refill. It would also be advantageous for the device to be constructed from components that are relatively simple and durable, so that breakdowns will be infrequent and servicing straight forward to perform. Yet another advantage would be for the device to be easy to install in a vehicle, without requiring extensive engine modification.

In any gas apparatus there is inevitably a risk of blockages developing in the gas circulation system, leading to a rise in pressure and an explosion. Since the device of the present invention is used in motor vehicles that contain highly flammable hydrocarbon fuel and one or more people in close proximity, a gas explosion could cause serious harm and undermine acceptance of an otherwise highly desirable technology. Accordingly, it is important that the device be designed to minimize this risk as much as possible. The device therefore should preferably include venting features to relieve gas pressure before it has a chance to build up to dangerous levels. Further, it would be especially advantageous if in the unlikely event of the venting features failing or of a spark being introduced, the structure of the device itself could contain the ensuing explosion, so that the risk of harm to the vehicle occupants would be measurably reduced.

The electrolysis cell of the present invention uses electrodes constructed of expanded nickel to generate gas, and includes a region designated as an electrolytic fog. A fan and condenser help lower the temperature of the gas and reduce moisture. The electrolysis is further enhanced by regulating the power input to the cell. In this way the device of the present invention produces an adequate supply of gas to aid combustion. The device delivers the gas to the engine under pressure, thereby ensuring a constant flow even when the air intake pressure is high due to turbocharger boost. The gases are continuously available, aided by a separate on-board water supply that automatically replenishes the cell when needed. The device contains both heating and cooling features that enable gas to be generated in extreme weather conditions. The only operator maintenance required is to occasionally refill the water supply. Even under commercial driving conditions, only one refill approximately every 3–4 weeks should be sufficient. The cell and kit are made of sturdy and simple components, with no moving parts or complicated electronics, so that breakdowns are infrequent and service costs minimized. Further, the device readily connects with existing engines. Power is received from the vehicle battery, and the output gas hose simply attaches to a standard input at the air intake manifold. The device includes overlapping safety venting features to relieve internal gas pressure if the-pressure rises above standard operating levels. Further, the device is built to pressure vessel standards so that in the unlikely event that an explosion occurs, it will be contained and less likely to cause actual harm.

Accordingly, there is provided a system for producing one or more gases for enhancing combustion in an internal combustion engine, said engine having an intake, the system comprising:

an electrolysis cell, for generating one or more combustion enhancing gases under pressure;

a gas conduit, for connecting the electrolysis cell to the internal combustion engine; and a flow regulator, operatively connected between the electrolysis cell and the intake of the engine, for regulating a flow of said combustion enhancing gases to said engine.

BRIEF DESCRIPTION OF THE DRAWINGS

Reference will now be made, by way of example only, to preferred embodiments of the invention as illustrated in the attached figures.

DETAILED DESCRIPTION OF THE PREFERRED EMBODIMENTS

The present invention is for a system comprising an electrolysis cell and associated kit that generates and delivers a gas that acts as a fuel additive for an internal combustion engine. Electrolysis is a well known process whereby an electrical current is passed through a water-based solution. The current splits the water molecules, releasing hydrogen and oxygen gases which can be directed to the engine. The gases are injected into the engine at the air intake, where they enhance combustion of the hydrocarbon fuel used by the engine.

The invention finds particular application with motor vehicles that are powered by internal combustion engines. The invention may be used with a variety of vehicles and fuels, including conventional passenger cars having gasoline engines, commercial trucks that use diesel engines and turbochargers, as well as specialized vehicles such as forklifts or tractors that may be powered by less common fuels such as propane, methane, or natural gas. The preferred embodiment described herein has been configured to meet the particular needs of large vehicles, such as the turbocharged, diesel engine powered commercial tractor-trailer trucks commonly used to move goods over long distances. It will be appreciated by those skilled in the art that the principles of the invention may be applied to other types of vehicles and internal combustion engines without departing from the spirit of the present invention.

Figure 6:
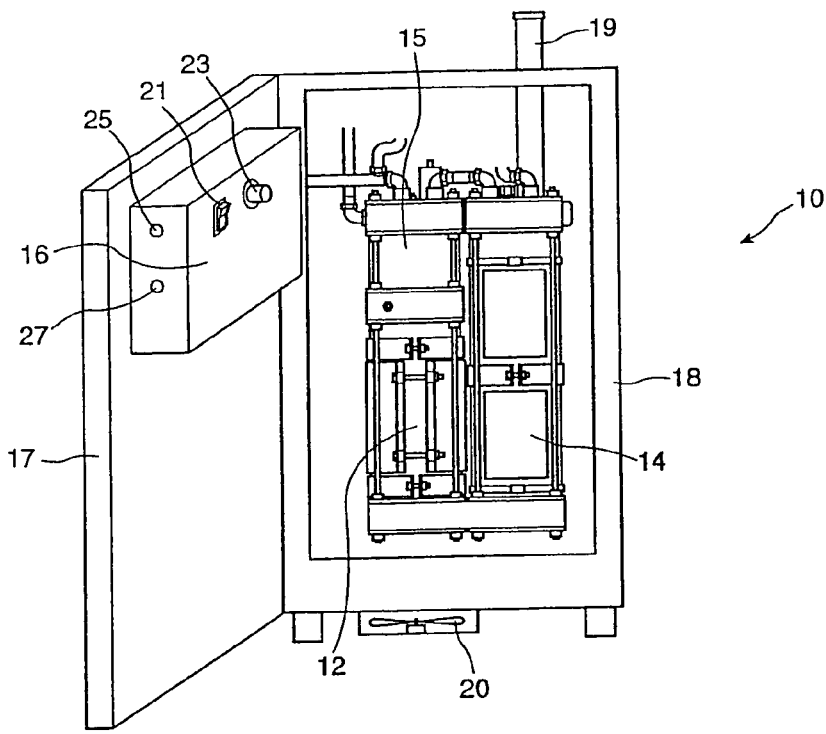
FIG. 6 is a front perspective view of the electrolysis cell and internal combustion engine kit of the present invention, including the case enclosure.

A broad overview of the apparatus or device of the present invention is shown in FIG. 6. The apparatus is generally indicated with reference numeral 10, and broadly comprises an electrolysis cell or cell 12, a replacement water reservoir or water reservoir 14, a condenser 15, and an electronic controller or electrical box 16 all mounted inside a case 18. The case 18 has a door 17 that opens to permit access to the various components. The water reservoir 14 includes a water input pipe 19 that extends through the top of case 18 for easy access. There is a fan 20 positioned directly underneath the cell 12 on the outside bottom surface of the case 18. The electrical box 16 includes an on/off switch 21, bypass switch 23, a "system operating" light emitting diode (l.e.d.) 25, and a "water low" light emitting diode 27. In the preferred embodiment the two l.e.d.'s are colored green and red respectively, though it can be appreciated that other colors may also be used.

The case 18 is preferably constructed from sheet metal, but it can be appreciated that any material that is light, strong, and preferably inexpensive may be adequate. For a large tractor-trailer truck or similar vehicle it has been found that the invention may be housed in a case 18 that is about 12 inches wide by about 24 inches high and 12 inches deep. A case of this size may be conveniently mounted outside the vehicle, such as on the side, beside the fuel tank. It can be appreciated that for this type of vehicle the case 18 should be sufficiently sturdy and well-sealed to provide adequate protection from the elements. It can similarly be appreciated that when applied to smaller vehicles such as passenger cars or light trucks, the invention may be housed in a case 18 that has smaller dimensions and that may be mounted somewhere inside the vehicle such as in the trunk or engine compartment.

Figure 7:
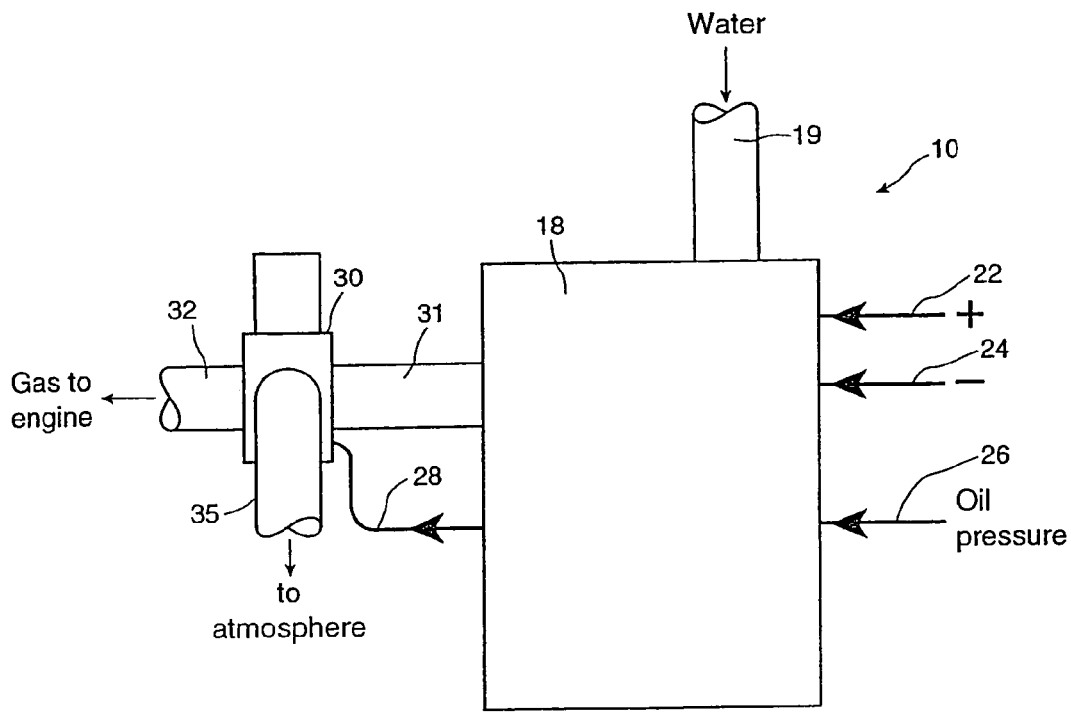
FIG. 7 is a diagram view of the external connections of the internal combustion engine kit of the present invention.

FIG. 7 is a diagram view of the present invention 10 showing the external connections into and out of the case 18. There is a positive lead 22 and a negative lead 24 that directly connect electrically with the respective positive and negative terminals of the vehicle battery (not shown). Similarly, an oil pressure lead 26 is directly connected to the oil pressure switch provided as a standard feature of internal combustion engines. Solenoid lead 28 is an electrical output line that activates an external solenoid 30, which is mounted external to the case 18. The various electrical inputs 22, 24, and 26, and the electrical output 28 connect to the electrical box 16 inside case 18. The other external connections of the device 10 include the water input pipe 19 and a gas conduit or gas output hose 31, which connects the cell 12 to the external solenoid 30. Another gas conduit or gas output hose 32 further connects external solenoid 30 with the engine. Gas output hoses 31 and 32 together represent a gas conduit that carries combustion enhancing gas from the cell 12 to an internal combustion engine. Another gas output hose 35 vents external solenoid 30 to atmosphere.

Figure 4:
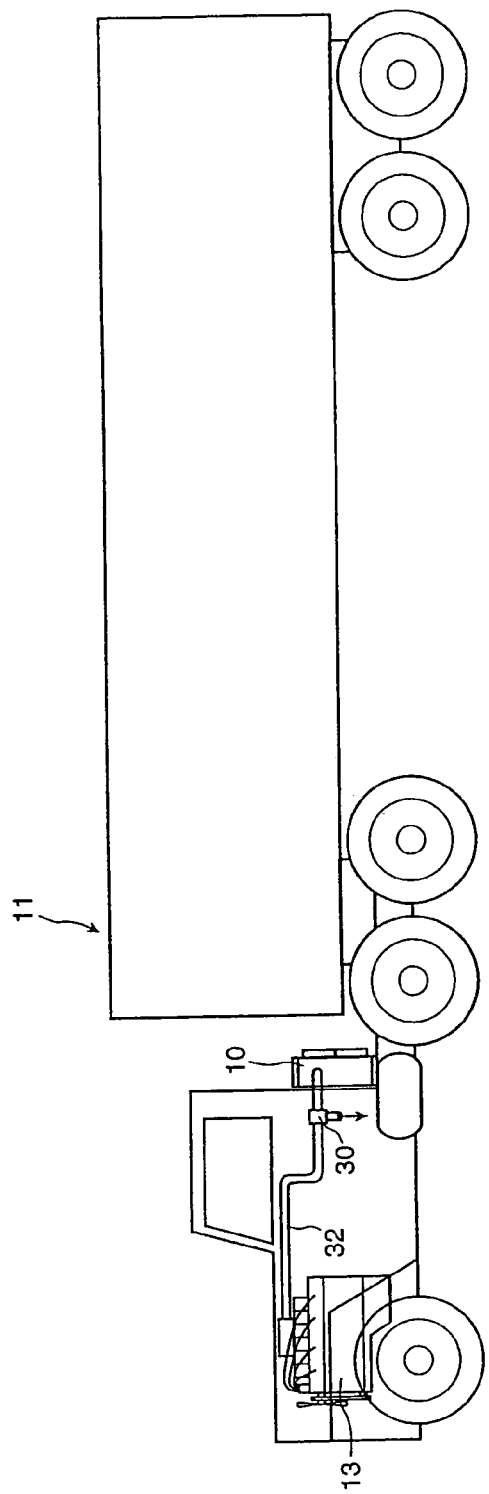
FIG. 4 is a diagram view of the internal combustion engine kit of the present invention mounted on a vehicle.

FIG. 4 shows the invention 10 mounted on the outside of a tractor-trailer type vehicle 11 having an internal combustion engine 13. It can be seen that external solenoid 30 may be conveniently mounted on the frame of the vehicle 11. The engine 13 has an intake or air intake manifold which receives air for use in the combustion process. Gas output hose 32 may be conveniently attached to the air intake manifold of the engine 13 at a standard plug input precast to receive auxiliary hoses.

It can now be appreciated how the electrolysis cell and kit of the present invention can be readily installed on a vehicle. All that is required is to mount the case 18 and external solenoid 30 at a convenient location inside or outside the vehicle, as appropriate for the particular type and size of vehicle. A hose is run from the case 18 to the external solenoid 30 and again from the external solenoid 30 to the intake of vehicle engine 13. Electrical wires are run to the device from the battery and oil pressure switch, and out to the external solenoid 30. No modification of the vehicle engine is required. In contrast with some of the prior art, no additional power sources or cooling systems are required.

Figure 1:
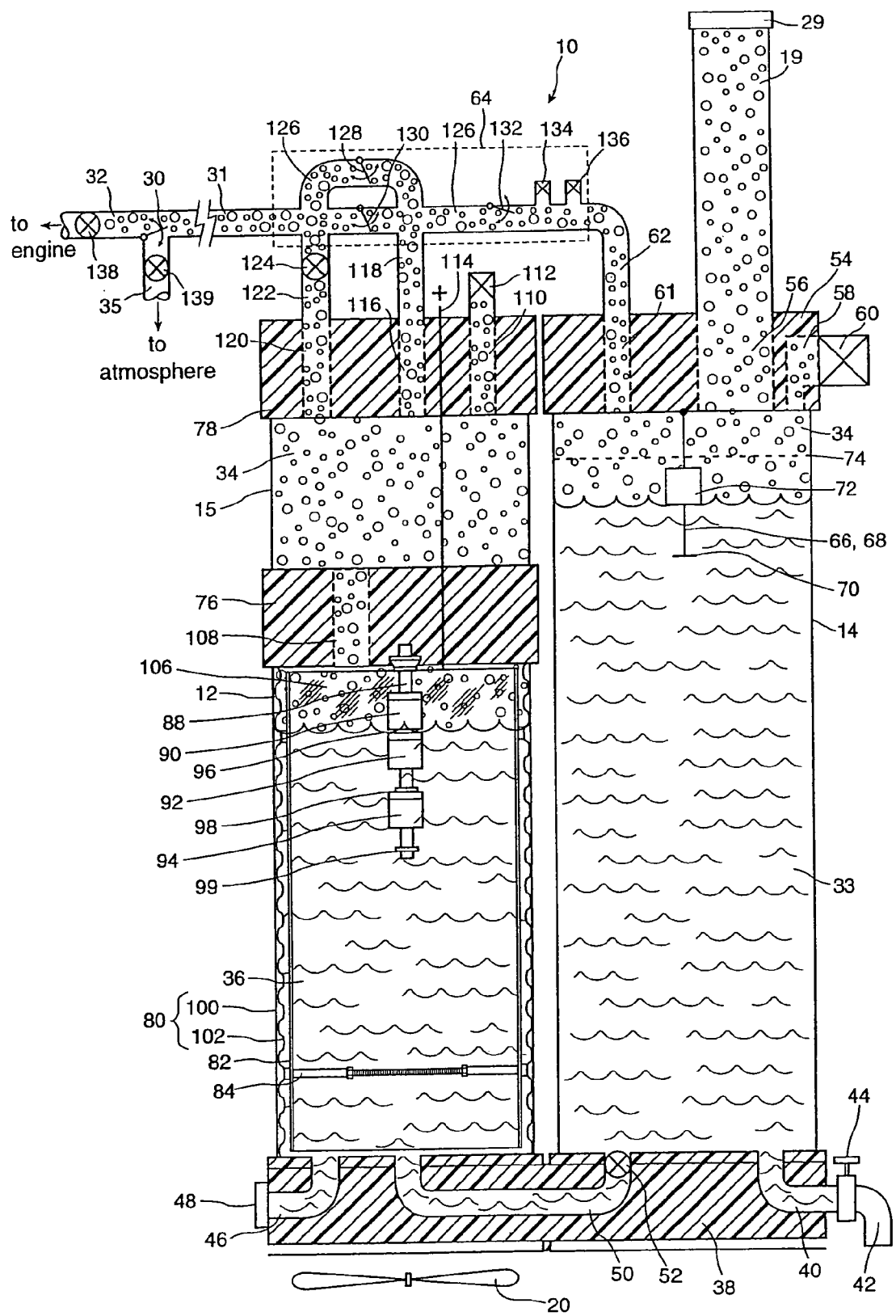
FIG. 1 is a front, cut-away view of the electrolysis cell and internal combustion engine kit of the present invention.

FIG. 1 is a front cut-away view of the invention 10, showing the main components and in particular illustrating the relative position of water and gas inside the system. It may be seen that water reservoir 14 contains water 33 in a lower part and a gas 34 in an upper part, above the water 33. Similarly the cell 12 contains a liquid solution or electrolytic solution 36 in a lower part and the gas 34 in an upper part, above the electrolytic solution 36. The water 33 is preferably distilled, since the presence of minerals may interfere with the electrolysis process. Gas 34 represents any one or more combustion enhancing gases released by electrolysis, and in the preferred embodiment represents a mix of hydrogen and oxygen gases, and may include hydrogen-oxygen bond pairs as well as isolated gas molecules.

At the bottom of the device 10 there is a lower block 38 which forms a base to support the water reservoir 14 and the cell 12. Lower block 38 is preferably constructed from a solid block of material that has heat insulating properties and that is impervious to the transmission of water 33, gas 34, and electrolytic solution 36. While the material should be strong and durable, it should also preferably be capable of being etched along a surface and drilled or bored through its interior. In this way, surface etchings may be made that facilitate fitting with adjacent components, and internal conduits could be created to allow for circulation of liquid or gas.

It has been found that ultra high molecular weight polyethylene is a suitable material. This type of polyethylene does not absorb liquid or gas, is very dense and strong, and can withstand cracking even in extremely cold temperature such as −40° C. It can be appreciated that other materials with similar characteristics may also be used if they provide adequate results.

In order to support water reservoir 14 and cell 12, lower block 38 in FIG. 1 will preferably have two circular channels etched into its upper surface to form a snug fit with the lower edges of the water reservoir 14 and cell 12, both of which are cylindrical in shape and have circular bottom edges. Lower block 38 is also shown having three internal conduits. There is a conduit 40 connecting the water reservoir 14 to an external faucet 42, passing through an external valve or tap 44. Water 33 stored in the water reservoir 14 naturally fills the conduit 40 and stops at tap 44 when tap 44 is closed. When tap 44 is opened water 33 from the water reservoir 14 will drain out of the unit through the faucet 42. There is a similar conduit 46 connecting the cell 12 to a plug 48. To facilitate service of the unit, electrolytic solution 36 may be conveniently drained from the cell 12 by removing plug 48.

An inlet or water conduit 50 connects the bottom of water reservoir 14 to the bottom of cell 12 through a check valve 52. The check valve 52 is a commonly used hydraulic component that passes fluid in one direction but acts as a check to prevent flow in the reverse direction. In this case, check valve 52 is configured to pass water from the water reservoir 14 to the cell 12 and to prevent backflow of electrolytic solution 36 from the cell 12 to the water reservoir 14. The check valve also has a pre-set pressure rating so that fluid can flow in the forward direction only when the pressure across the valve exceeds the rated value. As will be discussed in greater detail below, check valve 52 is preferably set at 6 lbs. Therefore water 33 will flow from the water reservoir 14 to the cell 12 when the pressure of the water 33 and gas 34 in the water reservoir 14 exceeds the pressure of electrolytic solution 36 and gas 34 in the cell 12 by more than six pounds.

It can be appreciated that a different pattern of etchings or arrangement of internal conduits might also be acceptable, so long as the lower block 38 or similar device fulfills the function of securing the cell 12 and water reservoir 14, and providing for the desired flow of water 33 and electrolytic solution 36.

The water reservoir 14 in the preferred embodiment of the invention is a stainless steel cylinder about 14½" high and 4⅛" in diameter, with a capacity of about 3.25 liters. It is preferred that the water reservoir 14 be constructed from a material that is strong and heat conducting. Accordingly, other materials besides stainless steel that possess these characteristics may also be used. It can be appreciated that the dimensions, shape, and capacity of water reservoir 14 may be varied to accommodate different configurations of the invention as appropriate. In particular, increasing or decreasing the volume or capacity of water reservoir 14 will increase or decrease respectively the time period that the device 10 may be operated between operator initiated refills of water reservoir 14.

Water reservoir 14 is bounded at its top by an upper block 54, which is preferably made of the same material and possessed of the same characteristics as the lower block 38 described earlier. Accordingly, upper block 54 may have a circular channel etched into its bottom surface to form a snug fit with the circular upper edge of water reservoir 14. Upper block 54 also is shown having three internal conduits. There is a conduit 56 that connects the water reservoir 14 with water input pipe 19. A removable cap 29 fitted at the top of water input pipe 19 keeps gas 34 from escaping to the atmosphere. Cap 29 is preferably made of stainless steel with a rubber seal, and may be removed to pour water through water input pipe 19, to refill water reservoir 14. To prevent tampering, a lock mechanism (not shown) should preferably be attached to cap 29 or otherwise fitted to the open top end of water input pipe 19.

A conduit 58 allows for passage of gas 34 to a rupture disk 60 attached to the side wall of upper block 54. The rupture disk 60 is a mechanical element sensitive to the pressure of the gas 34, and is structured to physically rupture or break when the pressure of gas 34 rises above a pre-set value or predetermined safety release pressure. Upon rupturing, gas 34 will vent from the interior of water reservoir 14 through the opening in rupture disk 60 to the atmosphere, causing the pressure inside water reservoir 14 to rapidly decrease to atmospheric pressure. In the preferred embodiment of the invention the rupture disk 60 is selected to rupture at a predetermined safety release pressure of 60 lbs. A reed switch (not shown) is preferably attached to rupture disk 60. The reed switch triggers and sends a signal to the electrical box 16 when the rupture disk 60 ruptures, thereby alerting the system that the unit has been depressurized.

Another conduit 61 in the upper block 54 connects the gas 34 to a hose 62 which connects with a manifold 64, shown in dotted outline in FIG. 1.

Inside the water reservoir 14 there is a fluid level detector 66 mounted at a top end to the bottom surface of upper block 54. The fluid level detector 66 includes a shaft 68, a stop 70, and a float 72 that slides along the shaft 68. There is also a reed switch (not shown) located inside the shaft 68 at a position designated as maximum fill level, represented as dotted line 74. When water is poured into water input pipe 19 the level of water 33 will rise above the stop 70 and cause float 72 to rise from its rest position at the stop 70. When float 72 further rises to the maximum fill level 74, float 72 will engage the reed switch, causing a signal to be sent that activates a buzzer (not shown) that alerts the operator to stop filling the water reservoir 14. The maximum fill level 74 is purposely set some distance below the upper block 54 so that there will be room to accommodate the expansion of water 33 if it freezes and becomes ice, which will occur if the unit is left turned off for an extended period of time in freezing temperature. In the preferred embodiment, this distance is approximately 1.5 inches from the top. It can be appreciated that other means besides a fluid level detector may also be used, as long as it functions to alert the operator to stop refilling the water reservoir 14 at the maximum fill level 74.

Turning now to the electrolysis cell 12, there is above the cell 12 a separator block 76, the condenser 15, and an upper block 78. Overall, the height from the base of cell 12 to the top of condenser 15 is about 14½", approximately the same height as water reservoir 14. Cell 12 and condenser 15 are both cylinders having a diameter about 4¼", approximately the same as the diameter of the water reservoir 14. The height of cell 12 alone is preferably between 8 and 12 inches, and in the preferred embodiment is 10 inches. It can be appreciated that these dimensions may vary to accommodate different configurations of the invention as appropriate.

Electrolysis cell 12 contains two electrodes instrumental to the electrolysis process, a cathode electrode or cathode 80, and an anode electrode or anode 82. Also shown is a tensioner 84. As will be shown in more detail below, tensioner 84 is used to maintain an electrical connection between two parts of the cathode 80.

Inside cell 12 there is a float sensor or fluid level detector 88 to detect the level of electrolytic solution 36 in cell 12. This element is fixed in place through its connection at a top end to the bottom surface of separator block 76. Fluid level detector 88 has three floats—a top or safety float 90, a middle or fill float 92, and a re-fill or low float 94. There is a stop 96 between the safety float 90 and fill float 92, a stop 98 between the fill float 92 and the low float 94, and a stop 99 at the bottom of the shaft of level detector 88. Each float is slidable along a portion of the shaft of level detector 88 defined by the closest higher and lower stops. There are also four reed switches (not shown) embedded in the shaft of fluid level detector 88: a first reed switch located near the top of the shaft at a predetermined high point that is activated by safety float 90, a second reed switch located under stop 96 at a predetermined fill point that is activated by fill float 92, and a third reed switch located under stop 98 at a predetermined re-fill point and a fourth reed switch located closer to stop 99 at a predetermined low point, both of which are activated by the re-fill or low float 94.

The body or cylinder of cell 12 defines an interior space that primarily contains electrolytic solution 36, above which there is gas 34. The liquid solution or electrolytic solution 36 is preferably a liquid mixture of potassium hydroxide (KOH) in distilled water. The preferred concentration is 33% KOH by volume, though it can be appreciated that other concentrations may also be acceptable if they produce adequate results. It is preferred that electrolytic solution 36 not include any anti-foaming agents, since this substance could migrate to the electrodes and interfere with electrolysis.

Once the electrolytic solution 36 is mixed the water component requires regular replenishment but the KOH generally only needs replenishment after about 3 years of normal use. It is preferred that the electrolytic solution 36 be initially supplied with the kit of the present invention, and that the KOH component thereafter be replenished only by qualified service personnel. It is preferred that access to KOH be restricted to qualified service personnel because KOH is a caustic material that can cause accidental harm if mishandled by individuals not familiar with its use, and because accurate apportion of the KOH is important to obtain efficient electrolysis. As will be discussed in greater detail, the water component of electrolytic solution 36 is replenished regularly and automatically from the water reservoir 14.

Figure 3:
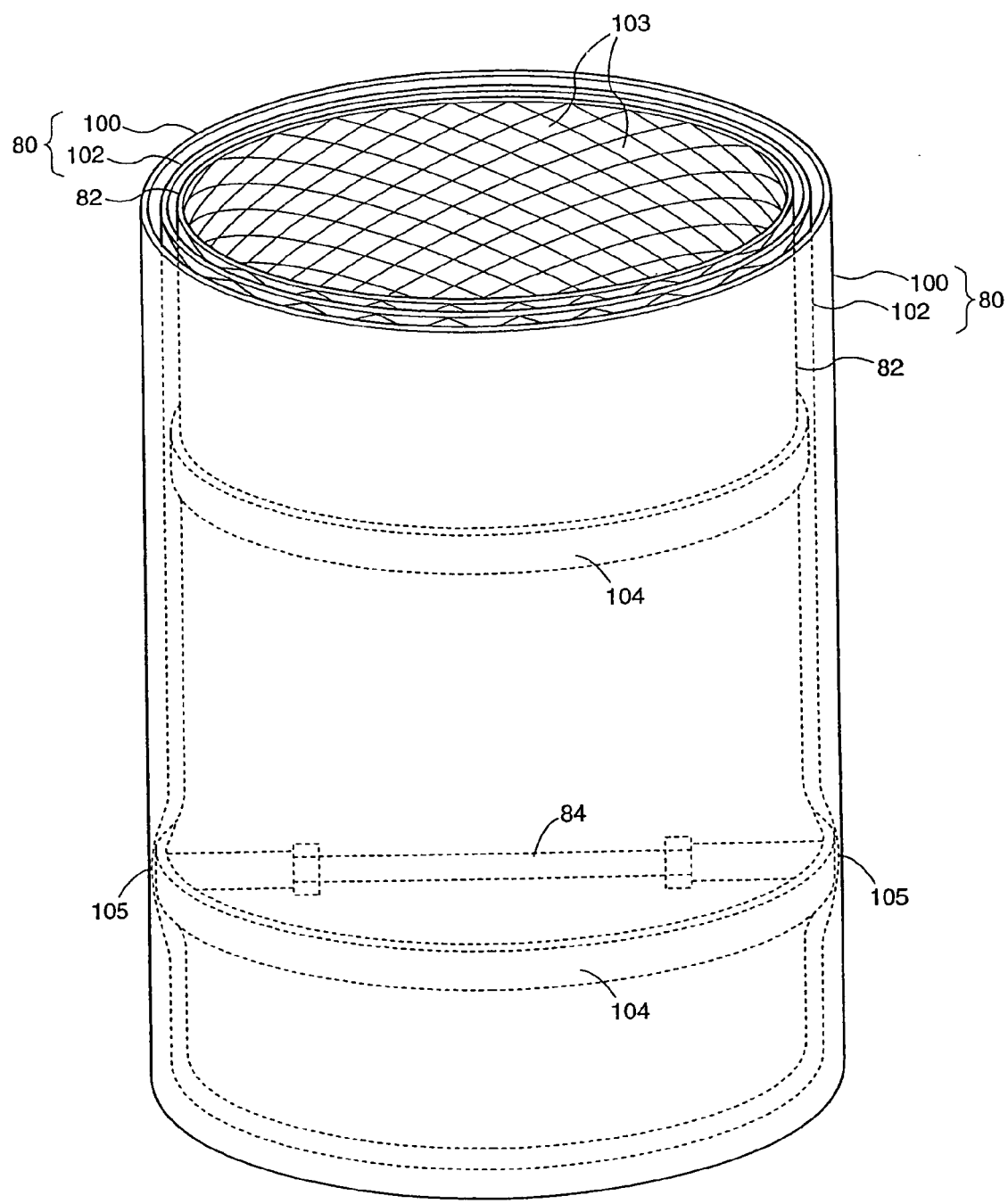
FIG. 3 is a perspective view of the electrolysis cell of FIGS. 1 and 2, showing hidden features.

FIG. 3 shows the cathode 80 and anode 82 in more detail. From this view it can be seen that the cathode 80 comprises two parts, an outer shell 100 and an inner mesh 102. As may be seen from the figure, outer shell 100, inner mesh 102, and the anode 82 are all cylindrical in shape, have the same or approximately the same height, and are of approximately the same width. The height of each electrode is about 10 inches. The outer shell 100 is about 4¼ inches in diameter with the inner mesh 102 and anode 82 each being progressively slightly smaller in diameter so as to fit within outer shell 100. The anode 82 is physically spaced apart and electrically insulated from the cathode 80, or more particularly, from the inner mesh 102, by spacers 104 shown in dotted line in FIG. 3. In the preferred embodiment the spacers 104 comprise two rings that encircle the anode 82 and are each approximately 1/16 inch thick. The spacers 104 keep the anode 82 and cathode 80 safely apart, but close enough to permit electrolysis to proceed productively. The preferred material for the spacers 104 is plastic, since plastic is electrically insulating, durable, and resistant to degradation by KOH, but it can be appreciated that other materials with similar characteristics would also be acceptable. As well, the spacers 104 may be formed using a different number of rings or have a different structure than a ring as long as the function of keeping the cathode 80 and anode 82 safely apart is fulfilled.

By virtue of their similar diameters, the outer cylindrical surface of inner mesh 102 essentially makes contact all along its surface with the inner cylindrical surface of outer shell 100, in effect forming cathode 80 as a single physical unit. To further ensure electrical contact, tensioner 84 is placed inside the anode 82 just behind one of the spacers 104. In that position tensioner 84 exerts an outward pressure against the anode 82 and spacer 104, causing spacer 104 to firmly press inner mesh 102 into outer shell 100 at two points of contact 105. Tensioner 84 is preferably a threaded nickel rod with nylon bushings at each end. The bushings may be threaded along the rod to reach an appropriate position for maintaining the desired outward pressure.

Both the cathode 80 and anode 82 should be conductors or made of conductive material such as metal, since electrical conduction through these elements is necessary to effect the electrolysis process. Since cathode 80 comprises two parts, an embodiment in which the inner mesh 102 is a conductor and outer shell 100 is not may also be acceptable. Preferably the electrodes are made from a pure form of a noble metal such as nickel, platinum, palladium, rhodium, or titanium. Noble metals have the benefit of not reacting with KOH, and the facility to enhance electrolysis by lending electrons to enhance current flow through electrolytic solution 36. A pure noble metal rather than an amalgam with a non-noble metal is desirable because a non-noble metal may react with KOH and plate or corrode the electrodes. In the preferred embodiment of the invention nickel having a purity level designated as "nickel 200" has been found to provide adequate results. An advantage of nickel is that it possesses a cubic-faced center molecular structure which has many reflective edges. It is well known that gas production from electrolysis is enhanced in proportion to the number of edges on the electrodes. Other benefits of nickel are that it is inherently strong, so that the cathode and anode can be made rigid and durable, and that it is generally lower in cost than some of the other noble metals. It can be appreciated that other noble metals or other metals that generate acceptable amounts of hydrogen would also be adequate.

In the preferred embodiment the outer shell 100 is comprised of schedule 10 seamless nickel pipe. By contrast at least one, and preferably both of the inner mesh 102 and anode 82 are constructed from an expanded metal, preferably nickel. An expanded metal has slits cut on its surface, and is then pulled or stretched from opposite ends so that the metal thins and a regular pattern of holes 103 break out along the surface. Opposite ends of the expanded metal piece can then be joined or folded along an edge to form a cylinder. As may be seen in FIG. 3, the holes 103 tend to be diamond-shaped and create numerous additional edges.

The degree to which the expanded metal is stretched or expanded is expressed as a percentage of open surface area relative to total surface area. Therefore, a metal designated as 50% expanded has openings or holes over 50% of the surface and metal over the other 50% of the surface. There is usually a tradeoff in that a higher degree of expansion creates more edges, which is desirable, but also results in thinner metal which is weaker and generates more heat. In the preferred embodiment it has been found that nickel expanded to a maximum of 50% produces adequate results. However it can be appreciated that as newer metallurgical techniques are developed, adequate results may also be available from nickel or other metals that are expanded by more than 50%.

The benefits of designing the cathode 80 into two parts can now be appreciated. The outer shell 100 forms the case of the cell 12. This is beneficially a seamless solid pipe in order to keep the electrolytic solution 36 from leaking out of the cell 12, and to prevent outside impurities from entering the cell interior. At the same time, the inner mesh 102 forms the interior surface of the cathode 80 and provides the electrolysis benefit of having numerous edges due to its construction from expanded metal. As noted the anode 82 is preferably also constructed from expanded metal. It can therefore be appreciated that the electrolysis cell 12 of the present invention contains numerous edges due to construction of both electrodes from expanded metal, as well as the use of a noble metal such as nickel that has a cubic-faced center molecular structure.

It can also be appreciated that the positions of the cathode 80 and anode 82 could be reversed, with the anode 82 becoming the outer electrode having an outer shell 100 and inner mesh 102, and the cathode 80 becoming the inner electrode, without any effect on the efficiency of the cell 12. In practical terms this can be accomplished merely by switching the electrical inputs to the electrode terminals. Similarly, different electrode architectures other than two cylinders in close engagement could also be employed if they give adequate results.

Returning to FIG. 1, it can be seen that the cathode 80 and anode 82 extend the full height of the cell 12, which is 10 inches in the preferred embodiment. It can be appreciated that the electrodes may be made less than the full height of the cell 12 if desired. The electrolytic solution 36 fills a lower part of the cell 12 to a level less than the height of the electrodes, and the gas 34 occupies an upper part or space above the electrolytic solution 36. That part of the cell 12 occupied by the gas 34 and that is above the electrolytic solution 36 is designated as a gas space for an electrolytic fog 106. In the preferred embodiment the level of the electrolytic solution 36 is about 8 inches and the gas space 106 is therefore about 2 inches high. As will be seen, during operation of the cell 12 these levels may change to about 6 inches and 4 inches respectively, as the level of electrolytic solution 36 drops and is then replenished with water 33. In general it is considered desirable that there be a minimum gas space of between ½ inch and 3 inches, preferably at least 1 inch, and most preferably 2 inches above electrolytic solution 36.

This gas space 106 provides room or clearance for the electrolytic solution 36 to slosh about when the vehicle goes up a grade or passes over bumps without triggering the "high water" alarm, discussed below. It has also been found that designing the cell 12 so that the cathode 80 and anode 82 extend above the electrolytic solution 36 to form a gas space 106 has provided adequate results. It can be appreciated that the gas space or electrolytic fog 106 of the present invention is quite different from much of the prior art, in which the electrodes are generally kept completely submerged within the liquid solution.

The floats and reed switches in fluid level detector 88 provide information on the level of electrolytic solution 36 in the cell. As electrolytic solution 36 fills the cell 12, the low float 94 rises until it is stopped by stop 98, and the fill float 92 rises until it is stopped by stop 96. As it rises, fill float 92 activates the second reed switch, which alerts the system to stop filling water into cell 12. This is the full position of cell 12, and is the condition represented in FIG. 1 where low float 94 and fill float 92 may be seen at the top of their range of travel, and safety float 90 is at the bottom of its range, resting on stop 96. In this full position the gas space 106 is about 2 inches high, and the electrolytic solution 36 is therefore about 8 inches high.

If water continues to fill the cell 12 safety float 90 will rise. If safety float 90 keeps rising to the point where it triggers the first reed switch, a "high water" alarm or signal will be sent to electrical box 16, shutting down the unit. This safety measure is provided to minimize the risk of the level of electrolytic solution 36 continuing to rise and possibly getting into the engine 13, where the KOH could prove harmful to the engine 13.

It can also be appreciated that when 11 vehicle climbs a grade or passes over bumps, the resultant sloshing about of electrolytic solution 36 may cause safety float 90 to rise. Since it is not desired for this type of activity to trigger a "high water" alarm, fluid level indicator 88 is preferably mounted in the center of the upper surface of cell 12. This arrangement may help avoid false alarms because when the vehicle climbs a grade the rise in liquid level is more likely to be observed towards the periphery of cell 12 rather than at the center.

As the cell 12 continues in operation the level of electrolytic solution 36 drops, causing fill float 92 to drop until it comes to rest at stop 98, followed by low float 94 dropping and eventually triggering the third reed switch. Upon this event a signal will be sent calling for a refill. As will be discussed in greater detail, a refill involves water 33 from the water reservoir 14 entering the cell 12 through inlet or water conduit 50 until fill float 92 rises to trigger the second reed switch.

In the event that refill does not occur, the level of electrolytic solution 36 will continue to drop until the fourth reed switch is activated by low float 94, which will trigger a "water low" signal shutting down the unit. This event will also turn on the red "water low" l.e.d. 27 on the electrical box 16, providing a visual indication to the vehicle operator that unit 10 has stopped operating due to a "water low" condition. The unit is shut down upon this condition being reached because at too low a level the concentration of KOH in electrolytic solution 36 becomes disproportionately high, which could in turn lead to the generation of an unacceptable amount of heat. As described further below, under this condition the unit may be brought back online by the operator performing a manual refill.

It can be appreciated that fluid level detector 88 provides the feedback necessary to keep the level of electrolytic solution 36 within a safe and efficient working range, including shutting down the system when the level gets either too high or too low.

The separator block 76 fits on top of cell 12, and is preferably a polyethylene block similar to lower block 38 discussed earlier. Accordingly, circular channels are preferably etched into the upper and lower surfaces of separator block 76, to form a snug fit with the cylindrical edges of condenser 15 and cell 12, respectively. Separator block 76 has an internal conduit 108 that acts as an outlet to receive gas 34 produced in cell 12, allowing gas 34 to rise from the electrolytic fog 106 to the condenser 15. Conduit 108 should be wide enough to allow gas 34 to flow without undue restriction, but also narrow enough so that separator block 76 functions as a heat insulator between the cell 12 and condenser 15. In the preferred embodiment adequate results have been obtained for the conduit 108 having a diameter of about ½ inch.

The condenser 15 is a seamless stainless steel cylinder about 3½ inches in height and 4 inches diameter. Due to the physical separation provided by the separator block 76, condenser 15 thermally isolates gas 34 in its interior, keeping it approximately 10° C. cooler than the gas 34 in the electrolytic fog 106 of cell 12. The effect of the temperature differential is that much of the moisture being carried by gas 34 will condense and form water droplets on the interior walls of the condenser 15. These droplets will tend to drip down through conduit 108 back into the electrolytic solution 36 in the cell 12. It can be appreciated that a different material may also be used to construct condenser 15 provided that, like stainless steel, it has a surface conducive to condensing water vapour and is preferably a heat conductor.

At the top of cell 12 is the upper block 78, which is another polyethylene block similar to those discussed earlier. As before, the lower surface of upper block 78 will preferably be etched with a circular channel to fit the cylindrical upper edge of condenser 15. Upper block 78 has a conduit 110 leading to a pressure switch 112, which is a pressure sensor set to trigger at a predetermined safety release pressure of 35 lbs in the preferred embodiment. There is an anode terminal 114 in the form of a threaded, solid nickel rod. As seen in FIG. 1, anode terminal 114 extends from above the top surface of upper block 78 down through the condenser 15 and separator block 76 to the anode 82, with which it makes contact. Further in upper block 78 there is a conduit 116 connected to a hose 118 which carries gas 34 directly into manifold 64. There is also a conduit 120 which carries gas 34 into manifold 64 through a hose 122 and a flow regulator 124. The flow regulator 124 is operatively connected between the cell 12 and the intake of engine 13, and regulates the flow of gas 34 from cell 12 to engine 13 according to the pressure at the air intake of engine 13. In the preferred embodiment, the flow regulator is a pressure release valve in the form of a check valve 124 set at 20 lbs pressure. As shown in FIG. 1, check valve 124 is preferably mounted on the outside of manifold 64 at the entry point of hose 122.

The check valve 124 is set to release gas 34 to the engine 13 upon the gas 34 reaching and just exceeding a release pressure, or 20 lbs in the preferred embodiment. As will be discussed, this pressure is towards an upper end of an operating range of pressures at the air intake of engine 13. It can be appreciated that other types of flow regulators than pressure release valves may also be used as long as they can suitably regulate the flow of gas 34 to the engine 13.

Turning now to manifold 64, an internal conduit 126 is shown to provide a functional representation of the circulation of gas 34 through the manifold 64. Internal conduit 126 connects with hose 62 coming from water reservoir 14, hose 118 coming from cell 12, hose 122 coming from cell 12 through check valve 124, and with gas output hose 31 which goes to external solenoid 30. It may be noted that internal conduit 126 makes possible a gas connection conduit connecting gas 34 from cell 12 to water reservoir 14 through hoses 118 and 62.

Manifold 64 also has a safety release valve or safety solenoid 128 and a fill solenoid 130 that independently and in parallel open or close access between internal conduit 126 and gas output hose 31. Similarly, there is a water reservoir solenoid 132 that opens or closes access between hose 62 coming from the water reservoir 14 and hose 118 going to cell 12. In FIG. 1 solenoids 128, 130, and 132 are represented for illustration purposes as valves, since functionally their effect is to open or close a path for the gas 34 to flow within internal conduit 126. It can also be seen from the figure that manifold 64 contains a pressure switch 134, pre-set at 11 lbs, and a pressure switch 136, which is a pressure sensor pre-set at a predetermined safety release pressure of 40 lbs.

It may be seen from FIG. 1 that pressure switches 134 and 136 are directly connected to hose 62 carrying gas 34 from water reservoir 14. Therefore, while in the preferred embodiment these pressure switches are mounted on manifold 64 for convenience, functionally they respond to the pressure of gas 34 in water reservoir 14 and are unaffected by the setting of water reservoir solenoid 132. Similarly, while hose 122 carries gas from the cell 12 through check valve 124 to the manifold 64, as shown in FIG. 1, the output past check valve 124 is otherwise connected directly to gas output hose 31, and is unaffected by the setting of exhaust solenoid 128 or fill solenoid 130.

In FIG. 1, the internal configuration of manifold 64 is represented in functional terms for clarity of illustration, and does not necessarily represent the actual internal mechanism of manifold 64. It can be appreciated that a person skilled in the art should be able to readily construct a functionally equivalent manifold based on the components and functional descriptions provided. In the preferred embodiment of the invention it has been found that solenoids specially constructed to control the passage of hydrogen, manufactured by the Burkert Company of Germany, provide adequate results.

FIG. 1 further shows gas output hose 31 connected to external solenoid 30. External solenoid 30 is a switchable valve in the form of a three-way solenoid that has at least two positions. External solenoid 30 can be set to connect gas output hose 31 to either the engine 13 through gas output hose 32 and a check valve 138 in one position, or to vent to the atmosphere through gas output hose 35 and a check valve 139 in another position. Check valves 138 and 139 are each set at 1/10 lb, and serve primarily to prevent any outside air from entering and possibly contaminating the cell 12. External solenoid 30 is set as appropriate by the electrical box 16 through the connection provided by solenoid lead 28. Generally, external solenoid 30 will be set to connect to the engine 13 through gas output hose 32 when the device 10 of the present invention is operating and generating gas 34, and will be set to vent to the atmosphere through gas output hose 35 when the device 10 is being shut down, and it is desired to purge gas from the system. As noted, gas output hose 32 may be conveniently attached to the intake manifold of the engine at a plug input precast to receive auxiliary hoses.

In the preferred embodiment of the invention gas output hose 31 and gas output hose 32 have a diameter of about 3/8 inch. It is preferred that the diameters of the other hoses in the system such as hoses 62, 118, and 122, as well as the various internal conduits also be approximately 3/8 inch to facilitate convenient coupling between components. It can be appreciated that other embodiments of the invention may use hoses having a different diameter, that may be more appropriate for systems operating at different gas pressure or production levels.

Figure 2:
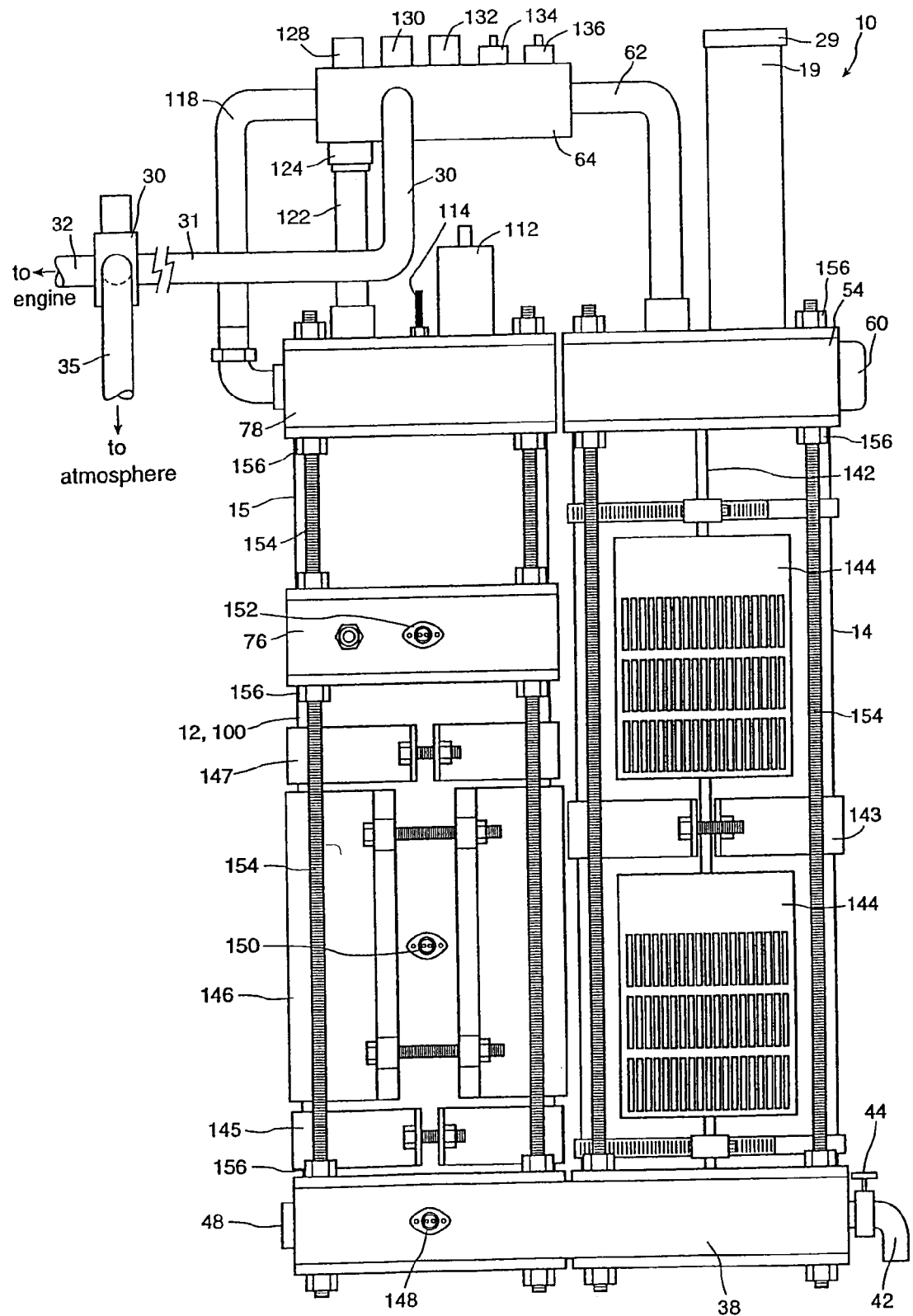
FIG. 2 is a front view of the electrolysis cell and internal combustion engine kit of FIG. 1.

FIG. 2 shows the elements of the device 10 of the present invention from the same front view as that shown in the functional cut-away view of FIG. 1. The water reservoir 14, electrolysis cell 12, polyethylene blocks 38, 54, 76, and 78, manifold 64, and various hoses connected to the manifold 64 that were described above may be seen. FIG. 2 also shows a case clamp 143 attached to the water reservoir 14, and case clamps 145 and 147 attached to the cell 12. These three case clamps securely hold the water reservoir 14 or cell 12 to which they are attached to the case 18. Electrically, the connection of cathode 80 through case clamps 145 and 147 to the case 18, which in turn is attached to the body of the vehicle, means that the cathode 80 will acquire the "negative ground" that is standard for most vehicles.

FIG. 2 also shows two power conditioning means or power supplies 144 attached by case clamp 143 to the side of water reservoir 14. The power supplies 144 are standard 10–16 volt type, DC to DC converters that step-up current and step-down voltage. Each power supply 144 receives approximately 6.9 amperes of current at 11.1 volts from the electrical box 16, and outputs a stepped-up current of approximately 23.9 amperes by stepped-down voltage of 2.4 volts to the electrodes of cell 12. The electrical input to the cathode 80 is made at case clamp 145, and to the anode 82 at anode terminal 114. Since case clamp 145, and therefore cathode 80, is held at the vehicle's electrical ground, power to the electrodes is essentially provided at the anode 82. It can also be appreciated that while the current and voltage output of power supplies 144 provide adequate results, other embodiments of the invention may obtain adequate results from different current and voltage configurations.

The water reservoir 14 as noted is preferably constructed of a strong, heat conducting material such as stainless steel. In the preferred embodiment the water reservoir 14 receives two coats of an insulating spray made from a ceramic compound, such as the type manufactured by Envirotrol, Inc. of California, U.S.A. The spray distributes a layer of insulation approximately $26/1000$ of an inch thick over the exterior surface of the water reservoir 14. The insulation provided by this material has been found to provide an adequate degree of heat retention. The entire surface of water reservoir 14 is sprayed except for a vertical strip 142 about ½ inch wide which is left as exposed metal.

In addition to providing electrical power to run the cell 12, the power supplies 144 also serve a dual purpose of acting as a heater for water reservoir 14. This is accomplished by mounting the two power supplies 144 on water reservoir 14 so that a portion of their metal surface contacts the exposed metal strip 142. In this way the heat naturally generated by power supplies 144 is transmitted to the stainless steel surface of water reservoir 14. The insulation that otherwise covers the surface of water reservoir 14 helps retain the transmitted heat inside water reservoir 14.

The benefit of this arrangement of power supplies 144 is that it provides heat to melt ice that may form inside water reservoir 14 when the vehicle is left turned off for an extended period in freezing weather. The ice must be melted to free up water 33 so it is available when needed to refill electrolytic solution 36 in cell 12. The heat provided by power supplies 144 provides adequate results in this respect. In the most extreme case, where the water level inside water reservoir 14 is at the maximum fill level 74 and freezes into a solid block of ice, the heat from power supplies 144 in the preferred embodiment has been found to melt the block of ice and restore the water 33 to liquid form in a reservoir melting time of approximately two hours.

FIG. 2 also shows a metal jacket or heat blanket 146 on the outside surface of the cathode 80 of electrolysis cell 12. The heat blanket 146 is a stainless steel sheet with an internal filament of conducting wire. When current is applied to the wire, heat from the wire is transmitted to the metal jacket, which distributes the heat over the wider area. The heat blanket 146 is provided to warm up the cell 12 in extremely cold weather. While the electrolytic solution 36 has a lower freezing temperature than the freezing point of water and does not actually freeze solid in such weather, it does tend to thicken to some extent. It has been found that when electrolysis is attempted in these circumstances the current demand required to effect electrolysis increases measurably. This current demand imposes a significant drain on the vehicle's electrical system, and may damage the regulator inside the alternator.

In order to avoid the risk of damage to the alternator, in the preferred embodiment of the invention whenever the temperature of the cell 12 is less than a predetermined cold temperature of −10° C. at start-up, output power from electrical box 16 is directed to the heat blanket 146 rather than to the power supplies 144. The heat blanket 146 is designed to draw the same power as cell 12, so there will be no inordinate drain on the vehicle's electrical system. After the unit has operated for some time and the temperature of cell 12 rises above −10° C., the current from electrical box 16 is redirected to the power supplies 144 and electrolysis can begin. It has been found that in the preferred embodiment, a start-up at −40° C. takes about 45 minutes to reach −10° C. Since electrolysis is an exothermic reaction which puts heat into the electrolytic solution 36, for the duration of the time that the vehicle 11 is running and the device 10 is operating the temperature of cell 12 should continue to rise and not fall below −10° C. Therefore if the heat blanket 146 is needed, it will generally only be at the beginning of a trip and for a limited time.

Temperature detection in selected locations is obtained through the use of temperature sensors, preferably in the form of thermodiscs. These devices contain a snap-action bimetal disc that can open or close an electrical connection upon a pre-set temperature being reached. They will re-set, that is return to closed if open, or return to open if closed, upon the temperature reverting back to the other side of the pre-set value. It has been found that the sensors manufactured by Elmwood Sensors of Rhode Island, U.S.A. for this purpose produce adequate results.

The thermodiscs are placed in the location where temperature detection is desired, and are connected electrically in the circuit of the device being monitored. There are three thermodiscs shown in the preferred embodiment of FIG. 2. Thermodisc 148 attaches to lower block 38 in order to monitor the ambient temperature around fan 20, and is accordingly connected electrically in the same circuit as fan 20. This thermodisc has a set temperature of 15° C., and will open the circuit driving fan 20, thereby stopping rotation of the fan, when the detected temperature drops below 15° C. In cool weather the additional cooling provided by fan 20 is generally not needed.

Thermodisc 150 attaches to outer shell 100 in order to monitor the temperature of cell 12, and is placed in the circuit driving the heat blanket 146. Its set temperature is −10° C. Accordingly, when the detected temperature drops below −10° C. thermodisc 150 closes, thereby directing current into heat blanket 146. When the temperature rises above the set point, thermodisc 150 opens and current is redirected to the power supplies 144 that supply the electrodes of cell 12.

Thermodisc 152 attaches to separator block 76 in order to monitor the overall ambient temperature, and is electrically connected in the main circuit containing oil pressure lead 26. This thermodisc is set to 80° C., and will open and thereby shut down the device 10 upon a general ambient temperature of 80° C. being reached inside the case 18. The temperature of 80° C. is selected for system shutdown because at this high temperature the electrical components may cease to function properly and the polyethylene blocks may even change shape.

FIG. 2 also shows threaded rods 154 and nuts 156 connecting the lower block 38 with upper blocks 54 and 78, and with separator block 76 of the cell 12. Since FIG. 2 shows one side of the unit 10, it can be appreciated that the water reservoir 14 and cell 12 each have four threaded rods 154, 30 two on each side. The threaded rods 154, nuts 156, and other associated hardware not shown such as flat washers and flanges are used to securely and tightly hold together the elements of the water reservoir 14 and cell 12. In the preferred embodiment of the invention the specifications governing the threaded rods 154 and other such hardware have been designed to conform to the American Society of Mechanical Engineers standard number B31.1 for pressure vessels. The apparatus 10 of the present invention is a pressure vessel since it is a container that encloses a gas under pressure.

This professional engineering standard specifies the various design parameters that affect the ability of the pressure vessel or container to withstand an internal buildup of pressure and an explosion. This includes the use of threaded stainless steel rods 154 and their positioning at corners of the vessel, the use of flat washers under each nut 156, lock washers to withstand vibration, and other factors such as the type and number of components, their tensile strength, and weld integrity. This is a fairly rigorous standard, and is generally applied for pressure vessels that are over 6 inches in diameter and that operate at about 30 pounds pressure. Since the present invention has a diameter of about 4 inches and operates at a pressure less than 30 lbs, it can be appreciated that use of this pressure vessel standard provides an added measure of safety. According to the standard, the threaded rods 154 should be able to withstand 14,000 lbs of pressure before coming apart.

By way of comparison, as was noted above the apparatus of the present invention already includes safety venting features that release pressure at much lower levels of 35, 40, and 60 lbs. Further, the individual components of the invention 10 also have pressure ratings. The hoses such as gas output hoses 31 and 32, and hoses 62 and 118 are rated at about 120 lbs, the polyethylene blocks 38, 54, 76, and 78 are rated at about 6,000 lbs, the stainless steel cylinders of the condenser 15 and water reservoir 14 are rated at about 14,000 lbs, and the nickel cell 12 is rated to withstand about 10,000 lbs.

An explosion might occur in the device 10 if a spark is introduced, or possibly due to internal compression if the pressure inside cell 12 should somehow rise to the range of a few hundred lbs. In view of the much higher pressure ratings of the materials and the pressure vessel standards of construction, such an explosion would likely be completely contained internally and would not lead to any external damage or harm.

The electrical box 16 as noted connects with positive lead 22 and negative lead 24 directly from the vehicle battery, oil pressure lead 26 directly from the oil pressure switch, and has an electrical output 28 to external solenoid 30. There are other electrical connections, not shown, between the electrical box 16 and the cell 12, such as a power out line carrying power to the power supplies 144, as well as lines connecting with the various pressure switches, fluid level detectors, and rupture disk 60.

The power received from the battery on positive lead 22 and negative lead 24 is approximately 12–13 volts at 15 amperes, or 195 watts. The power out line carries approximately 11.1 volts at 6.9 amps or 76 watts to each power supply 144, for a total of about 152 watts. Each of the power supplies 144 output 2.4 volts at 23.9 amperes for a total of about 57 watts, or 114 watts total. It can be appreciated that these power figures may vary as appropriate for other embodiments of the present invention.

The internal components of electrical box 16 include a single large solenoid used to start up the cell 12, and several relays and fuses, all operating at vehicle standard 12 volts.

When the vehicle engine is started, oil pressure lead 26 triggers a relay which activates the large solenoid, connecting the power input from the battery to the line out to the power supplies 144. For the operator's convenience, the outside of electrical box 16 includes on/off switch 21, bypass switch 23, the green "system operating" l.e.d. 25, and the red "water low" l.e.d. 27. Electric box 16 of the preferred embodiment also contains an hour-meter, which records the duration of time that the unit 10 is operating.

It can accordingly be appreciated that the device 10 of the present invention presents a very clean and simple interface with the vehicle operator. The device operates automatically and does not require any active intervention by the operator while he or she is operating the vehicle. Accordingly, there is no need for an operator panel anywhere inside the vehicle. The operator can turn the device 10 on or off using on/off switch 21, or use the bypass switch 23 to perform a manual refill, as described below. When lit, the green l.e.d. 25 provides reassuring feedback that the device 10 is operating correctly. Otherwise, when this l.e.d. is out it is an indication that the device 10 is not operating and there is no electrolysis. The red l.e.d. 27 when lit indicates a "water low" situation, alerting the operator to refill the water reservoir 14 and initiate a manual refill.

It can further be appreciated that the durability of the unit 10 is enhanced by its construction from durable materials such as nickel, stainless steel, and ultra high molecular weight polyethylene blocks. The electrical components are simple and reliable analog devices such as solenoids, relays, and fuses, operating at the industry standard 12 volts. There are no digital electronic or programmable components in the present invention, because such components would add complexity and cost, and may be more likely to break down due to temperature sensitivity or programming errors. Further, there are no moving parts in the cell 12 and kit of the present invention. Accordingly, it can be appreciated that the present invention is well suited to operate reliably for extended periods, particularly in the hostile road environment where service technicians are generally unavailable. When servicing is required, the simple design of the device 10 should allow repair and maintenance procedures to be relatively straightforward.

The operation of the present invention can now be described. Initially, when the vehicle 11 is parked and the engine 13 is turned off, there is no power to the cell 12, no electrolysis, and no gas 34 or gas pressure present in the system. When the vehicle operator turns the key to start the engine, the oil pressure switch of the vehicle is activated, typically as a 12 volt signal. This simultaneously raises oil pressure lead 26 from zero to 12 volts, which trips a low current relay that in turn closes the large solenoid inside electrical box 16.

At start-up, prior to directing power to the power supplies 144, the circuits inside the electrical box 16 automatically check the various pre-conditions to safe operation of the device 10. Since the electronics are analog, this preliminary check occurs essentially instantaneously, and consists of detecting either the presence or absence of signals associated with each particular pre-condition. The signals to be monitored therefore include those associated with: thermodisc 152 on separator block 76, to confirm that the unit is not already at a high temperature above 80° C., the first reed switch triggered by safety float 90 and the fourth reed switch triggered by low float 94 in cell 12, to confirm that the level of electrolytic solution 36 is neither too high or too low respectively, pressure switch 136, to confirm that the system is not already pressurized above 40 lbs, and the reed switch associated with rupture disk 60, to confirm that the rupture disk 60 has not ruptured. If any of these conditions are confirmed as having occurred the system will not start and electrolysis will not take place.

Further start-up monitoring includes thermodisc 148 on lower block 38. If this thermodisc triggers, indicating a temperature under 15° C., the fan 20 will not activate. If the temperature is −10° C. or colder, thermodisc 150 on cell 12 will trigger, informing the system to activate the heat blanket 146 rather than power supplies 144.

If there are no disabling conditions electrical box 16 sets external solenoid 30 to output through gas hose 32 to engine 13. Electrical box 16 also delivers power to the power supplies 144, which regulate the current and voltage and deliver power to the electrodes through anode terminal 114 and the cathode 80. If thermodisc 150 has been activated, heat blanket 146 will receive the power from electrical box 16 until the temperature rises above −10° C., at which time thermodisc 150 will re-set and power will be re-directed to power supplies 144. Once power is received by power supplies 144, electrolysis commences inside cell 12 and hydrogen and oxygen gases of gas 34 are generated. It can be appreciated that upon operation of power supplies 144 the heat generated will automatically be transmitted to water 33 in water reservoir 14, to melt water 33 if it is frozen. In this way the present invention makes productive use of the heat from the power supplies 144 that would otherwise be dissipated without providing any benefit to the system.

Turning now to the configuration of manifold 64, in the ordinary course safety solenoid 128 and fill solenoid 130 are both held closed, thereby blocking any gas 34 in the internal conduit 126 and cell 12 from access to gas output hose 31. Water reservoir solenoid 132 is held open, so there is a direct connection from cell 12 to water reservoir 14 through hose 118, internal conduit 126, and hose 62. As the cell 12 generates gas 34, the gas 34 will fill the upper parts of cell 12 and water reservoir 14, building up the gas pressure inside the device 10 from its initial zero level. Since the space enclosed by cell 12 and water reservoir 14 is fixed or predetermined in volume, it can be appreciated that as more gas 34 is produced the pressure inside this space increases with time. When the pressure of gas 34 just exceeds the release pressure of 20 lbs, gas 34 will be released by the flow regulator or 20 lb check valve 124 through hose 122 to gas output hose 31 and gas output hose 32 to the engine 13. Accordingly, during this steady state operation of the device 10, gas 34 flows from the cell 12 to the engine at about 20 lbs pressure, and the cell 12 and water reservoir 14 are equalized at about this same 20 lbs pressure.

It has been found that it generally takes about 4–5 minutes for the system to pressurize from zero to 20 lbs. Therefore, the operator of the vehicle may experience a noticeable increase in power approximately five minutes after the engine is started. As discussed in greater detail below, the system should in the ordinary course remain operating and provide the benefits of electrolysis throughout the rest of the trip.

During operation of the cell 12 an ample amount of heat is generated which tends to reduce the efficiency of the electrolysis process. On its own, the temperature of the gas 34 will generally reach about 75° C. in the gas space 106 of cell 12, and about 10° C. less, or 65° C., in the condenser 15 due to the thermal isolation provided by the separator block 76. Activation of the fan 20 pulls hot air down and out of the case 18, cooling both the cell 12 and condenser 15 to about 55° C. and 45° C. respectively. In cooler weather these temperatures will drop further. System cooling is also facilitated by the use of heat-conducting metal such as nickel rather than plastic for the cell 12. It can therefore be appreciated that the cooling features provided contribute to the efficiency of electrolysis. Further, unlike some of the prior art, a separate cooling system is not necessary.

It has been noted that gas 34 generally contains some quantity of moisture or water vapour. This can be a problem in cold weather, since the water vapour may freeze and create blocks in the circulation of gas 34. In particular, ice particles may form in gas output hose 31 when warm gas 34 meets the cold outside temperature. If left to build up, a pressure blockage could lead to a system breakdown or explosion.

The risk is reduced in the present invention due to several factors. First, since moisture increases with heat, the cooling features of the invention generally lower the moisture level. Also, when the gas 34 reaches the condenser 15, the temperature differential between the condenser 15 and cell 12 causes much of the moisture to condense and collect on the internal walls of the condenser 15. The collected water droplets will drip back down, through conduit 108, to cell 12. This reduces the amount of moisture carried by gas 34 to gas output hose 31. Further, while gas 34 is flowing inside gas output hose 31, freezing will not occur even in extreme cold due to the movement of the gas. Therefore, a heat trace to warm the output hose is not necessary. Additionally, if external solenoid 30 is mounted below the air intake at engine 13, any moisture that is carried in gas output hose 31 will tend to collect at the bottom of external solenoid 30 rather than proceed to the engine. This moisture will eventually get vented to atmosphere through gas output hose 35 when the system shuts down.

When operating in the steady state, the cell 12 generates approximately 600 ml of hydrogen and oxygen gases per minute, which has been found to produce adequate results when delivered to the vehicle engine 13.

The device 10 of the present invention produces a reasonable quantity of gas within a compact space due to the various features that enhance the electrolysis process. These include the use of the metal nickel, and in particular the expanded form of the metal used for both the cathode 80 and anode 82, which increases the number of edges available for electrolysis. Gas production is also enhanced in the present invention due to the use of regulated input power that provides a higher current flow into the electrodes. It is well known that gas production from electrolysis increases with current. The approach taken by the present invention may be contrasted with some of the prior art, in which a unregulated power was provided from the battery directly to the cell, and was considered desirable for its simplicity. However, this resulted in low current levels which required compensation through adjustment of the electrolytic solution. In turn, this created a problem of excessive heat, which led to a need for more elaborate cooling or pressurization. Therefore, the apparent simplicity of a direct battery to cell connection is undermined by the complexity of systems required to compensate for the shortcomings of that approach. It can therefore be appreciated that by regulating current, the present invention achieves adequate gas production using only the vehicle battery as power source without requiring cumbersome additions such as a specialized cooling system or extra alternator or generator.

The gas produced includes a mixture of individual hydrogen and oxygen atoms as well as combination hydrogen-oxygen bond pairs. While an individual gas could be separated out if desired, it is believed that the presence of both gases individually and in combination enhances the combustion process occurring in the engine 13. It is also believed that the passage of gas 34 through gas space 106 contributes to the effectiveness or combustible quality of the gas 34.

It can now be appreciated how the device 10 of the present invention produces an adequate and effective amount of hydrogen and oxygen gases to aid combustion.

The cell 12 produces gas 34 at a rate determined by the current input to the electrodes, and by factors associated with the design of the cell 12 itself, such as the construction of electrodes using expanded nickel arranged in a cylindrical configuration. Since these factors are fixed once the unit is powered up, the volume of gas produced by the cell 12 for any given period of time will be a constant. In particular, the rate at which gas 34 is produced by the cell 12 is independent of the operating factors of the engine 13, such as its speed in rotations per minute (rpm) or air intake pressure. However, the rate at which gas 34 is actually delivered to the engine 13 will ordinarily be dependent to some extent on the air intake pressure or speed of the engine 13. By contrast, the device 10 of the present invention has been designed so that in most operating circumstances the rate at which gas 34 is delivered to engine 13 is constant.

The engines of certain vehicles such as tractor-trailer trucks of the type represented by vehicle 11, as well as some passenger cars, are equipped with turbochargers. A turbocharger essentially uses an impeller driven by exhaust gas to pull in air from the outside and deliver it under pressure to the air intake port of the engine. As the engine's speed or rpm increases, the force of the exhaust rises leading to faster rotation of the impeller and higher air pressure intake. This relationship is appropriate since an increase in rpm means there are more combustions in a given period of time. Air intake pressure therefore needs to rise in unison with rpm in order to supply the greater quantity of air demanded for that same given period of time. The large tractor-trailer type vehicles typically idle at about 600–800 rpm and 10–15 lbs pressure, and generally have an upper range of about 1,800 rpm and 30 lbs pressure.

Figure 5:
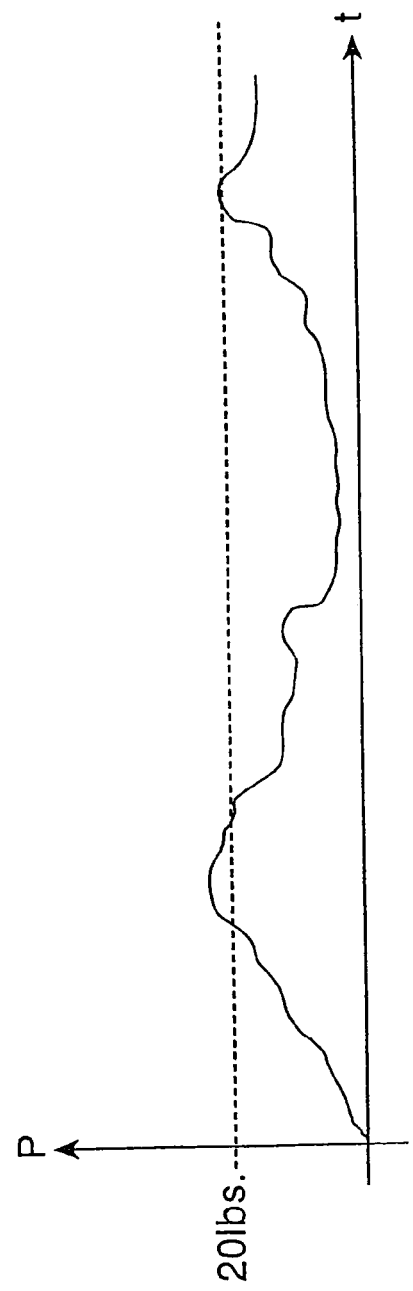
FIG. 5 is a representative graph of air intake pressure of an internal combustion engine against time.

FIG. 5 is a representative graph of pressure (P) at an air-intake port of the engine 13 against time (t). It may be understood that the air pressure (P) is essentially related to the speed in rpm of the engine 13. Therefore in FIG. 5, as the engine operates between a cold start and a high rpm, it can be seen that for this particular engine 13 air intake pressure P operates in a range of pressures between zero and approximately 22 lbs.

As noted, gas output hose 32 carrying gas 34 from cell 12 enters engine 13 at the same air intake port as that used by the turbocharger. Therefore, if the air pressure input from the turbocharger is greater by a certain extent than the pressure of gas 34 in gas output hose 32, the gas 34 may be effectively blocked from reaching the combustion chamber. It can now be appreciated why the rate at which gas 34 is actually delivered to the engine 13 will ordinarily be dependent to some extent on the air intake pressure or speed of the engine 13.

In the present invention gas 34 is delivered to engine 13 under pressure. In particular, since gas 34 passes through a flow regulator in the form of a pressure release valve or check valve 124, which in the preferred embodiment is set at 20 lbs, the gas will be delivered at a constant release pressure of 20 lbs. This release pressure for check valve 124 was selected because, as shown in the representative graph of FIG. 5, it is towards an upper end of the operating range of pressures at the air intake. The expected air intake pressure from the turbocharger will be less than 20 lbs most of the time. Therefore, the gas 34 containing hydrogen and oxygen gases generated by cell 12 will in most circumstances be at a higher pressure than the turbocharger pressure, and will not be blocked from delivery to engine 13. This ensures a relatively constant flow of gas 34 into engine 13, even when the air intake pressure fluctuates due to engine load.

Gas 34 delivered under 20 lbs pressure from cell 12 may be blocked if the turbocharger pressure rises to a level above the release pressure of 20 lbs, perhaps 22–25 lbs. However, such circumstances will typically occur only briefly. Even if there were a prolonged period of high pressure, as pressure continues to build up in cell 12 it will become high enough to overcome the higher pressure level. However, such delays will generally be infrequent, since the invention specifically delivers gas 34 at a constant pressure that is towards the upper end of the operating range of pressures at the intake, and therefore exceeds the expected air intake pressure to engine 13 for all but the most extreme engine loads.

Since the production of gas 34 is constant, and since the gas 34 will be accessible to the engine 13 most of the time, it follows that the rate of delivery or flow of gas 34 into engine 13 will also be constant. It further follows that the effect of gas 34 on the efficiency of engine 13 will vary depending on the speed of the engine. Since the flow of gas 34 is constant due to the flow regulator, the lower the engine speed, the higher the proportion of gas 34 in the combustion chamber. According to the present invention, the highest proportion of gas 34 occurs when the engine is idling. It is well known that internal combustion engines are less efficient and more polluting when operating at lower rpm, and particularly when idling. By delivering a relatively higher proportion of hydrogen and oxygen to the combustion when the engine is idling or at low rpm, the benefits of reduced emissions are optimized.

The delivery of gas 34 in a regulated-flow allows the present invention to be flexibly used with a wide variety of vehicles and engine types. All that is required is to set the flow regulator or check valve 124 to a value that is sufficient to overcome the typical air intake operating pressure of the particular vehicle engine. Vehicles such as passenger cars that don't use turbochargers may be well served with flow regulator 124 set at just a few lbs, whereas more powerful turbocharged vehicles may require the check valve 124 set at 25 lbs or higher. In general, a release pressure set in a range of 1 to 50 lbs should accommodate most vehicle types. It can also be appreciated that the approach of the present invention is more flexible than the prior art which relied on the vacuum intake provided by a passenger car. That device of the prior art could not work with turbocharged, pressurized air-intake engines. By contrast, the device 10 of the present invention can work with any type of engine since it relies on a flow regulator operated within the device 10 itself.

The present invention is able to provide gas 34 to the engine 13 for relatively long and uninterrupted periods of time. Since the only element that gets used up during electrolysis is the water component of electrolytic solution 36, the device 10 of the present invention includes a water reservoir 14 to hold a supply of water 33, and includes the means to refill electrolytic solution 36 in cell 12 with water 33 from water reservoir 14. In most cases the cell 12 will be refilled from water reservoir 14 automatically by the device 10, without any activity or even awareness by the operator. In other circumstances a manual refill by the operator is required.

When the engine 13 is started and the unit is first turned on, there is always a possibility that water 33 in water reservoir 14 may be unavailable because it is frozen. As noted, the heat from power supplies 144 should melt any ice in water reservoir 14 in a reservoir melting time of about 2 hours or less. Therefore, according to the present invention, enough replacement water to replenish the electrolysis cell 12 is made available at or before the reservoir melting time.

To ensure that cell 12 can fully operate until melt water becomes available, the device 10 ensures that the electrolytic solution 36 is at least at a level just above the third reed switch of fluid level detector 88 at the time the unit is started. As will be explained in greater detail below, this is accomplished by checking the level when the unit is being shut down, and performing a refill at that time if necessary, so there will be sufficient electrolytic solution 36 at the subsequent start-up. Also, as previously noted, the device 10 will shut down if low float 94 drops to the level of the fourth reed switch. Therefore, at start-up the device 10 of the present invention will have at minimum an amount of electrolytic solution 36 that occupies the space between the third and fourth reed switches of fluid level detector 88. This amount is most preferably enough to last for a minimum operating time that is longer than the reservoir melting time of about 2 hours, and in the preferred embodiment there is sufficient electrolytic solution 36 to last for over 6 hours.

It can be appreciated that the scenario described above is a worst case, and that it is more likely that the level of electrolytic solution 36 will be at least somewhat higher than the third reed switch at the time of start-up. Of course, as described above even the worst case scenario can be readily accommodated by the present system. Furthermore, since freezing conditions occur primarily in certain geographic locations and during winter, the operator will generally be aware of the possibility that water 33 may freeze. Accordingly, if the operator is so inclined, when the vehicle stops for an extended period in freezing weather the operator could open tap 44 and drain the water 33 out of water reservoir 14 to eliminate the possibility of a frozen block when the vehicle 11 is restarted. The operator would have to remember to refill the water reservoir 14 before restarting the vehicle 11.

During operation of the vehicle 11 the device 10 of the present invention will automatically refill electrolytic solution 36 with water 33 from water reservoir 14. This refill operation is fairly rapid and automatic, and requires no action by the operator.

The refill operation is initiated when low float 94 in fluid detector 88 drops to the point where it triggers the third reed switch. As a precondition for refill to occur, the system requires that the pressure in water reservoir 14 be a minimum of 11 lbs. This information is provided by pressure switch 134, which as noted is pre-set to trigger at 11 lbs. If this condition is met, fill solenoid 130 is opened and water reservoir solenoid 132 is closed. This connects cell 12 directly with the engine 13 (through 1/10 lb check valve 138), and blocks the connection between cell 12 and water reservoir 14. Just prior to these changes effected by the fill signal, the gas pressure in cell 12 and water reservoir 14 had been equalized at about 20 lbs. As a result of the changes brought about by the fill signal, the pressure in cell 12 drops rapidly to the generally lower pressure environment of engine 13, while the original higher 20 lbs pressure level previously present is preserved in water reservoir 14.

Since there is now a high pressure of about 20 lbs in gas 34 of water reservoir 14, and a lower pressure in gas 34 of cell 12, the water 33 in water reservoir 14 is urged to flow into cell 12 through conduit 50. However, due to the 6 lb check valve 52 in conduit 50, water 33 will not flow until the pressure differential is at least 6 lbs. Therefore, upon pressure in cell 12 dropping to about 14 lbs or less, water 33 will flow into cell 12 through conduit 50, thereby refilling cell 12. The pressure in cell 12 therefore does not have to drop to zero, only to a point about 6 lbs less than the pressure in water reservoir 14.

As refill occurs, the level of electrolytic solution 36 rises, in the process raising first low float 94 and then fill float 92. Refill will continue until fill float 92 rises to the level of the second reed switch. Upon triggering of this reed switch a signal is sent that resets fill solenoid 130 and water reservoir solenoid 132 to their original closed and open positions respectively. This will restore the original gas flow arrangement, opening the path between the cell 12 and water reservoir 14, and compelling gas 34 from the cell 12 to go through flow regulator 124 to reach engine 13. There will be a slight delay as cell 12 rebuilds the 6 lbs of pressure that it lost. When the pressure reaches 20 lbs regular flow to the engine 13 will resume. In this way, a sufficient amount of water 33 is provided to replenish the electrolytic solution 36 in cell 12.

In the preferred embodiment of the invention the volume of water contained in cell 12 between the second and third reed switches is only about 100 milliliters (1/10 of a liter). This is a fairly small amount, and it suggests that once water 33 starts to flow the refill will be completed fairly quickly. The rate of fill may also be somewhat faster where there is a higher level of water 33 in the water reservoir 14, since that will increase the pressure above check valve 52.

The pre-condition that there be 11 lbs of pressure in water reservoir 14 is needed to ensure that there is at least a minimum sufficient pressure to drive water 33 into cell 12. At 11 lbs, in order to overcome 6 lb check valve 52, the engine pressure would have to drop to 5 lbs. This is about as low as the pressure may get while the vehicle is being driven, and is a pressure that does not use the turbo boost provided by the turbocharger. In that case, there may be a delay in refill until such time as the vehicle is idling or otherwise travelling at a slow speed. Itch therefore be appreciated that by imposing the minimum requirement of 11 lbs pressure, the device 10 of the present invention ensures that it does not call for a refill when the water reservoir 14 is unable to deliver it because it is not pressurized sufficiently.

Check valve 52 is positioned in conduit 50 because there is always a latent pressure provided by the column of water 33 in water reservoir 14. If there were no check valve 52, water 33 might on occasion flow spontaneously into cell 12.

It can be appreciated that other values of pressure switch 134 and check valve 52 may be selected to better accommodate the flow of water 33 in device 10. For example, pressure switch 134 could be set at 15 lbs and check valve 52 at 10 lbs. These particular values were not selected for the present embodiment due to inconsistent tolerance in the manufacture of the 20 lb check valve 124. It can be appreciated that as the manufacturing tolerance improves, other pressure values for these elements may become acceptable.

Using the settings and container sizes of the preferred embodiment of the present invention, it has been found that the vehicle 11 can operate for approximately 180 hours where the cell 12 contains electrolytic solution 36 up to the full level of the second reed switch, and where water 33 in water reservoir 14 is at the maximum fill level 74. This time period represents approximately 150 hours from the water 33 stored in water reservoir 14, and another 30 hours from the electrolytic solution 36. Within the cell 12, the device 10 will run for approximately 24 hours from a full position (second reed switch) until it calls for a refill (third reed switch), and as noted it may run for about another 6 hours before shutdown is imposed (fourth reed switch).

If the operator forgets to refill the water reservoir 14 then the device 10 may well run out of water 33, and low float 94 may drop to the fourth reed switch, triggering a signal shutting the system down. This signal causes power to the power supplies 144 to be cut off, stopping any further electrolysis. Safety solenoid 128 will open and external solenoid 30 will be set to vent, so that gas 34 in the cell 12 and water reservoir 14 will vent to the atmosphere. The red "water low" l.e.d. 27 on electrical box 16 will light up, providing a visual indication to the operator that the system has shut down because of low water.

This condition can be corrected by the operator. Upon shutting down the engine for 10 minutes as an additional safety measure to ensure that the system is depressurized, the operator will refill water reservoir 14 by removing cap 29 and pouring in water until float 72 rises to the reed switch, setting off a buzzer. Then the operator will press and hold down bypass switch 23 on electrical box 16. While the bypass switch 23 is down, power is sent to power supplies 144, thereby re-activating electrolysis. Also, safety solenoid 128 is closed and external solenoid 30 is re-set to direct gas 34 to engine 13 through gas output hose 32. Water reservoir solenoid 132 remains open and the red "low water" l.e.d. 27 remains on. During this time gas 34 is being generated and the system is re-building internal pressure. After several minutes the pressure in water reservoir 14 will reach 11 lbs, causing the green "system operating" l.e.d. to light up and the red "low water" l.e.d. 27 to turn off. At that point the operator can release bypass switch 23, and the system will perform an automatic refill and resume normal operation.

The present invention comprehends supplying water to the device 10 approximately every 150–180 hours of vehicle running time. It can be appreciated that the amount of water to be supplied, approximately 3.25 liters or about 1½ gallons, is reasonable and would not be particularly demanding. In most cases there will already be some water 33 in water reservoir 14, so the amount to be supplied will be even less. Depending on the duty cycle of the vehicle 11, refills may be required as infrequently as once every 3–4 weeks, or about once a month. For example, assuming a work load of 10 hours a day, 6 days a week, a refill would be required only about once every 3 weeks. It can also be appreciated that water refills may be conveniently incorporated into regular vehicle maintenance. Accordingly, for most operators it is likely that running out of water 33 while on the road and having to perform a manual refill will occur only very infrequently, if at all.

It can now be appreciated how the device 10 of the present invention operates to move gas 34 from the cell 12 to the engine 13, and water 33 from water reservoir 14 to cell 12. Rather than relying on components such as pumps that have moving parts, as is frequently the case with the devices taught by the prior art, the device 10 of the present invention accomplishes this same function using only the internal pressure generated within the cell 12 by the electrolysis process itself. Components such as pumps invariably add cost, bulk, and complexity, and may be prone to breakdown in very cold weather. Of course it can be appreciated that components such as pumps may be used as appropriate in other embodiments of the present invention.

The operation of the various safety features of the device 10 of the present invention may now be described. A first safety feature relates to the level of electrolytic solution 36 in cell 12. The highest level to which the electrolytic solution 36 is preferred to rise is to the second reed switch, located just under stop 96 on fluid level detector 88, to form the gas space 106. Additionally, if due to a malfunction in the water refill operation or for any other reason the level of electrolytic solution 36 were to rise and reach condenser 15 and gas output hose 31, there is a risk that KOH from electrolytic solution 36 could enter the air intake port of engine 13. This is undesirable, as KOH could cause damage to the engine 13.

Accordingly, the device 10 of the present invention includes safety float 90 and its corresponding first reed switch located on fluid level detector 88. If the level of electrolytic solution 36 in cell 12 rises above stop 96 and continues to rise, safety float 90 will be pushed upwards until first reed switch is triggered. The signal generated by the first reed switch alerts the system to immediately perform an early shut down procedure. This involves cutting off power to power supplies 144, to stop any further electrolysis, opening safety solenoid 128 and water reservoir solenoid 132, and setting external solenoid 30 to vent to atmosphere through gas output hose 35. It can be appreciated that these steps will immediately depressurize both the cell 12 and water reservoir 14, and equalize them at atmospheric pressure. This should prevent any further flow of water 33 into cell 12, so that there will be no further rise in the level of electrolytic solution 36. In this case the operator cannot restart the unit, and the unit will remain unavailable until it is inspected and re-certified for service by a qualified service technician.

The other safety features of the device 10 of the present invention relate to the risk of a buildup in pressure of gas 34. This could occur due to a variety of causes and may include, for example, an inadvertent crimping of a hose or blocking of an internal conduit, or a situation where a stone flies off the road and lodges in gas output hose 31. Regardless of the particular cause, any pressure buildup is a cause for concern because of the risk of explosion that it presents. The device 10 of the present invention accordingly contains several overlapping safety features or pressure relief means designed to safely vent internal pressure when it reaches a predetermined safety release pressure, before pressure rises to a dangerous or excessive level.

Pressure switch 112 is built into upper block 78 and directly monitors the pressure inside cell 12. It can be appreciated that since water reservoir solenoid 132 is usually kept open, pressure switch 112 also in effect monitors the pressure of water reservoir 14. The only time that cell 12 and water reservoir 14 will be at different pressure levels is when water reservoir solenoid 132 closes to enable the system to perform a water refill operation. Pressure switch 112 is set to trigger at a predetermined safety release pressure of 35 lbs, and comprises the first level of defence protecting the system from an undue rise in pressure.

If the pressure in cell 12 rises to 35 lbs, pressure switch 112 sends a signal that causes safety solenoid 128 to open. Safety solenoid 128 acts as a gas bypass or safety gas conduit that allows gas 34 in cell 12 to bypass the 20 lb check valve 124 and connect to the lower pressure environment of engine 13. As a result of this connection, the pressure in cell 12 will decrease rapidly. When pressure switch 112 detects that the pressure is below 35 lbs, it sends a signal causing safety solenoid 128 to re-set in a closed position, so that gas 34 returns to its regular flow through check valve 124. Usually, the pressure in cell 12 will drop fairly rapidly by about 3–5 lbs before pressure switch 112, operating slower due to the inertia of its mechanical construction, is able to reset and respond.

This 35 lb pressure check is useful where there are temporary blockages, such as an ice chip or stone that blocks a hose temporarily and is then dislodged. It can be appreciated that the safety solenoid 128 may even activate several times in succession, and that the act of repeated or intermittent activation may itself help dislodge this type of blockage.

A second level of defence against a rise in pressure is provided by pressure switch 136. This pressure switch is located on manifold 64 and directly monitors the pressure of water reservoir 14, and indirectly, through open water reservoir solenoid 132, the generally equal pressure of cell 12. In the embodiment of the present invention pressure switch 136 is pre-set to a predetermined safety release pressure of 40 lbs.

A pressure rise to 40 lbs is considered serious enough to shut down the system. It is generally desirable however to first vent the pressurized gas 34. Accordingly, upon triggering pressure switch 136, safety solenoid 128 is opened and power to power supplies 144 is cut off to stop further electrolysis. Safety solenoid 128 acts as a gas bypass or safety gas conduit that allows gas 34 in cell 12 to bypass the 20 lb check valve 124 and connect to the lower pressure environment of engine 13. At the same time current is closed through a resistive circuit that includes a 14 second time-delay fuse. For 14 seconds the system vents, which is sufficient time in most circumstances to reduce the pressure to safe levels. When the fuse blows after 14 seconds the device 10 is shut down. The device 10 is then preferably returned to qualified service personnel in order to be restored to service.

Yet a third fallback or relief vent is provided by rupture disk 60. This device is a manual "blow off" valve that mechanically blows out or ruptures if the pre-set pressure of 60 lbs is reached. Unlike the 35 lb and 40 lb pressure switches described above, which are electrically driven, the rupture disk 60 is strictly mechanical and responds directly to pressure by physically breaking open. Therefore, when the rupture disk 60 blows out, the hole created in upper block 54 acts as a gas bypass immediately allowing gas 34 to vent to the lower pressure environment of the atmosphere. Unlike the 40 lb pressure release described above, there is no need or opportunity for an intermediate venting period. Once ruptured, the unit should preferably be returned to qualified service personnel to have a new rupture disk 60 installed.

Since rupture disk 60 is mechanical, the system or electrical box 16 will not ordinarily be aware that there is a hole in the system, and accordingly will continue to provide power to the electrodes. The gas 34 produced at this point will simply vent harmlessly to the atmosphere rather than pressurize and enter engine 13. Electrolysis will continue until the low float 94 drops to the water low position. The green "system operating" l.e.d. 25 will remain lit until water low is reached, indicating incorrectly that the system is working properly.

While there is nothing wrong with allowing the system to run itself down in this fashion, it is generally preferable to bring the system to a more orderly and proper shut-down. Accordingly, in the preferred embodiment of the invention a reed switch is attached to rupture disk 60. The reed switch is connected to rupture disk 60 in such a way that it sends a signal to electrical box 16 when rupture disk 60 blows. This signal alerts the system to cut off power to power supplies 144, stopping further electrolysis, and to set external solenoid 30 to vent to atmosphere through gas output hose 35. In addition, both l.e.d's 25 and 27 turn off, providing a correct visual indication that the system is no longer working.

It can be appreciated that the risk of a strictly mechanical element such as the rupture disk 60 failing by withstanding a rise in pressure to the pre-set level is quite low. Further, even if it does fail to rupture at the pre-set level, the mechanical strength of the rupture disk 60 will likely give way upon any further rise in pressure. Accordingly, the rupture disk 60 acts in effect as a "fail safe" backup in the device 10 of the present invention.

While it is highly unlikely that the system pressure will rise significantly above 60 lbs without triggering a built-in safety feature, the device 10 of the present invention includes yet further safety measures inherent in the design of the device itself. As noted earlier, the materials from which the device 10 is constructed are rated to withstand thousands of pounds of pressure. Further, the system as a whole is built to pressure vessel standards which provide a similarly high degree of protection. Accordingly, if the internal pressure were to rise by several hundred pounds and set off an explosion inside cell 12, it is believed that there would be no visible external effect. However it is more likely that before that occurs, a component of the system such as a hose, or a fitting connecting a hose to manifold 64 or upper block 54 or 78, would fail in a safe manner by blowing out, quickly relieving the high pressure situation by venting gas 34 to the atmosphere.

Accordingly, it can be appreciated that the individual safety features, construction methods and materials incorporated into the design of the device 10 of the present invention minimize the risk of a harmful or destructive explosion.

The procedure followed by the system when a particular trip taken by vehicle 11 is complete and the vehicle engine 13 is turned off may now be described. Turning off the engine 13 causes the oil pressure to drop and the oil pressure switch and oil pressure lead 26 to go to zero. In response, electrical box 16 sets external solenoid 30 to vent to atmosphere through gas output hose 35, and cuts off power to the power supplies 144 so that electrolysis stops. This allows any gas 34 that is in output hose 30 to vent to atmosphere. However, unlike the early venting situations related to relief from an inordinate rise in pressure, there is no immediate need to vent cell 12 and water reservoir 14 to atmosphere. Instead, for the time being safety solenoid 128 is kept closed and water reservoir solenoid 132 is kept open. Since no more gas 34 is being produced, 20 lb check valve 124 effectively stops any further flow of gas 34 into output hose 30.

Instead of immediately venting, the system takes the opportunity to check and prepare the level of electrolytic solution 36 in cell 12 for the subsequent start-up. The device 10 starts a timer (not shown) set to a predetermined settling time to give the layer of foam and bubbles that tends to form on top of electrolytic solution 36 during electrolysis a chance to settle down. At the conclusion of the predetermined settling time, which is 5 minutes in the preferred embodiment, a more accurate reading of the level of electrolytic solution 36 can be obtained. If the low float 94 is at the level of the third reed switch or lower, the system will perform an automatic refill by opening fill solenoid 130 and closing water solenoid 136. If the low float 94 is positioned above the third reed switch, even if only marginally, the condition for refill will not be met and no refill will be performed. Once the refill matter is settled, the system is shut down in the conventional way by opening safety solenoid 128, allowing all of gas 34 from the cell 12 and water reservoir 14 to vent to the atmosphere.

The benefit of the above refill precedure on shutdown is that it assures the operator that on the next startup the cell 12 will either be full or at the very least have a level of electrolytic solution 36 just above the third reed switch. As discussed, this is necessary in very cold weather, because the water 33 in water reservoir 14 may be frozen solid and not available for refill for several hours. The level of the third reed switch is a predetermined refill level which as noted, contains enough electrolytic solution 36 to enable the device 10 to continue to run for a minimum operating time.

It may be noted that a situation may arise where on shutdown electrolytic solution 36 is at a level just above the third reed switch, so there is no water refill. On subsequent start-up, water 33 is frozen and will therefore be temporarily unavailable to replenish cell 12. Further, shortly after start-up the level of electrolytic solution 36 will fall to the third reed switch and trigger a fill request, which will cause fill solenoid 130 to open. Therefore cell 12 will be directly connected to engine 13 but refill will not be possible until water 33 melts, which could take several hours. In this situation, cell 12 and water reservoir 14 will simply operate at a lower pressure than 20 lbs for a period of time. While this situation is not as advantageous as having the gas output at a constant 20 lbs, it is an adequate temporary measure until water 33 defrosts and a proper refill and repressurization can take place.

It can be appreciated that since gas 34 is purged from the system at shutdown, there is no danger posed by the presence or storage of volatile gas 34 in the parked vehicle.

The electrolysis cell and kit of the present invention effectively delivers adequate amounts of hydrogen and oxygen gases to the combustion chamber of the internal combustion engine 13. The efficiency of the engine improves as a result, because the presence of the highly volatile gases enables the engine to burn more hydrocarbon fuel than was previously possible. Since the flame speed of the gases is about 10 times faster than conventional fuel, the burn is also faster. The combustion is therefore completed faster and closer to the beginning of the combustion cycle when the piston is at or near the top of the cylinder. Accordingly, the cooling of the cylinder as the piston descends is more effective since there is less burn taking place on the way down. This has the benefit of decreasing exhaust temperature and lowering the amount of nitrous oxide produced. In a diesel engine which relies on compression alone to ignite the fuel, the added gases have an effect almost like a spark plug in enhancing the quality of combustion. Further, the added gases even enable the engine to burn some of the carbon deposits that tend to build up inside the cylinder, so that the engine may get cleaner upon continued use of the device 10 of the present invention.

These beneficial effects on combustion have resulted in improved gas and diesel mileage efficiency on the order of approximately 5–15%. Power and torque also improve because the more complete burn at the top results in an improved power stroke. Improvements of about 10–14% in horsepower and torque have been observed. Furthermore, significant reductions in the emission of gaseous and solid pollutants on the order of about 40% have been recorded. Accordingly, unlike traditional engines where cleaner operation and improved mileage come at the expense of power, the present invention provides improvements in both mileage and power, while also running cleaner with a cooler exhaust temperature.

All of these benefits come at a cost of a power draw of about 13 volts by 15 amperes from the vehicle battery, which represents about 195 watts or approximately ⅓ horsepower. This is a relatively minor draw, and is similar to the drain imposed by adding an extra set of headlights.

It can now be appreciated how the electrolysis cell and kit of the present invention addresses some of the problems associated with the use of electrolysis to generate gas for use as a fuel additive for internal combustion engines. The present invention produces adequate amounts of hydrogen and oxygen gases and delivers them effectively and at a constant rate to the engine. The flow of gas is continuous and uninterrupted even on long trips and in extreme weather conditions. The device is also safe from the risk of explosion as it contains several overlapping vent relief features and is built to pressure vessel standards. Furthermore, the device is easy to maintain, service, and install. Some of these benefits are achieved, in part, through efficient use of the available components. The power supplies used to provide power to the cell also function to melt ice that may form in the water cylinder in cold weather, and the system makes use of internal gas pressure to circulate both gas and water without needing additional components such as pumps.

It will be appreciated by those skilled in the art that the foregoing description was in respect of preferred embodiments and that various alterations and modifications are possible within the broad scope of the appended claims without departing from the spirit of the invention. For example, while reference is made to internal combustion engines such as those used in vehicles, the invention may also be used with combustion engines not used in vehicles and with non-combustion engines such as oil burners (furnaces) or boilers. Also, if it is desired to produce a proportionate increase in efficiency at higher engine speed or rpm, it may be useful to add another power supply, and vary the power to the power supplies in accordance with engine speed. In this way, power to the cell and the cell's gas output can be increased when the engine is operating at higher speed. Various other modifications will be apparent to those skilled in the art but are not described in any further detail herein.

I claim:

1. A system for producing one or more gases for enhancing combustion in an internal combustion engine, said engine having an intake, the system comprising:
   (a) an electrolysis cell, for generating one or more combustion enhancing gases from an electrolytic solution;
   (b) a gas conduit, for connecting the electrolysis cell to the intake of the internal combustion engine;
   (c) a pressure regulator, operatively connected between the electrolysis cell and the intake of the engine, for maintaining a positive pressure in said cell;
   (d) a water reservoir to hold water to replenish said cell;
   (e) a water conduit between said water reservoir and said cell; and
   (f) a pressure connection between said electrolysis cell and said reservoir wherein said positive pressure in said cell is communicated to said reservoir to drive said water from said reservoir into said cell to replenish said electrolytic solution in said cell.

2. The system as claimed in claim 1 wherein said electrolysis cell includes a gas space above said electrolytic solution and said pressure connection is between said gas space and said water reservoir.

3. The system for producing one or more gases according to claim 1, wherein said pressure regulator is a valve.

4. The system for producing one or more gases according to claim 3, wherein upon said electrolysis cell generating an internal pressure sufficient to overcome said valve, flow of said combustion enhancing gases is permitted to said intake.

5. The system of claim 3 wherein said valve is a check valve, the check valve being adapted and positioned to block outside air from entering said cell and to permit gas to flow from said cell to said intake.

6. The system as claimed in claim 1 further including an electronic controller for controlling operation of said system.

7. The system as claimed in claim 6 further including a reservoir valve to seal said reservoir and a refill valve to unseal said cell, said reservoir valve and said re-fill valve being controlled by said electronic controller, wherein when said cell is pressurized said electronic controller selectively opens and closes said re-fill valve and said reservoir valve to fill said cell with water from said reservoir.

8. The system for producing one or more gases according to claim 7 wherein said pressure regulator is a pressure release valve set to a release pressure from said cell towards an upper end of an operating range of pressures of said intake.

9. The system for producing one or more gases according to claim 8, wherein said release pressure is set to a value between 1 and 50 pounds per square inch.

10. The system for producing one or more gases according to claim 8, wherein said release pressure is about 20 pounds pa square inch.

11. The system for producing one or more gases according to claim 1, wherein the rate of flow of said combustion enhancing gases from said cell to said engine is relatively constant as said intake engine pressure of said engine changes.

12. The system for producing one or more gases according to claim 1, wherein the rate of flow of said combustion enhancing gases from said cell to said engine can be increased when the engine is operating at higher speed.

13. The system for producing one or more gases according to claim 1, further including pressure relief means to reduce the pressure of said one or more combustion enhancing gases in said cell when the pressure in said cell exceeds a predetermined safety release pressure.

14. The system for producing one or more gases according to claim 13, wherein said pressure relief means comprises a pressure sensor, set to detect said predetermined safety release pressure, and a gas bypass, to connect said combustible gas produced in said cell with a lower pressure environment upon the pressure of said gas exceeding said predetermined safety release pressure.

15. The system for producing one or more gases according to claim 14, wherein said pressure sensor is a pressure switch and said gas bypass is a safety gas conduit, said safety gas conduit being switchable between an open and a closed position.

16. The system for producing one or more gases according to claim 15 wherein said predetermined safety release pressure is at least 35 pounds per square inch.

17. The system for producing one or more gases according to claim 16 wherein said pressure sensor comprises a rupture disk set to mechanically open at said predetermined safety release pressure, and said gas bypass comprises an operative connection between said cell and the atmosphere.

18. The system for producing one or more gases according to claim 17 wherein said predetermined safety release pressure is at least 60 pounds per square inch.

19. The system for producing one or more gases according to claim 1, wherein said cell is a pressure vessel having walls constructed to contain about 10,000 pounds per square inch pressure.

20. The system for producing one or more gases according to claim 19 wherein said cell has end blocks rated to withstand about 6,000 pounds per square inch pressure.

21. The system for producing one or more gases according to claim 1, further including a switchable valve on said gas conduit, said valve having at least two positions, wherein in one position said valve permits said one or more gases to pass from said cell to said intake of said internal combustion engine, and in the other of said positions said valve permits said one or more gases to pass from said cell to the atmosphere.

22. A method of producing one or more gases for enhancing combustion in an internal combustion engine, said engine having an intake, said method comprising:
(a) providing an electrolysis cell containing an electrolytic solution, for generating one or more combustion enhancing gases under pressure, a reservoir containing a supply of a liquid used to replenish said electrolytic solution, a gas conduit, for connecting the electrolysis cell to the intake of said internal combustion engine, and a flow regulator, operatively connected between the electrolysis cell and the intake of the engine, for regulating a flow of said combustion enhancing gases to said engine;
(b) activating said electrolysis cell, to produce one or more gases under pressure; and
(c) regulating the flow of said one or more gases to said internal combustion engine by means of said flow regulator;
(d) connecting said pressure of said gases to said supply of liquid, to drive a sufficient amount of said liquid into said cell to replenish said electrolytic solution in said cell.

23. A method of producing one or more gases according to claim 22, wherein said step of activating said electrolysis cell includes storing said gases produced by said electrolysis cell in a predetermined volume, so that the pressure of said one or more gases increases with time.

24. A method of producing one or more gases according to claim 22, wherein said step of providing an electrolysis cell includes providing a safety release valve operatively connected to said electrolysis cell, and wherein said step of activating said electrolysis cell includes relieving pressure within said cell by venting said gases to a lower pressure environment through said safety release valve when said pressure of said one or more gases exceeds a predetermined safety release pressure or when said cell is de-activated.

25. A system for producing one or more gases for enhancing combustion for an internal combustion engine, the system comprising:
(a) an electrolysis cell, for generating one or more gases from an electrolytic solution, said electrolytic solution having a lower freezing temperature than the freezing point of water;
(b) a replacement water reservoir, to hold water to replenish the electrolysis cell;
(c) an automatic refill system configured to automatically, upon shutdown of said system, replenish said solution with water from said reservoir such that the cell contains a sufficient supply of said electrolytic solution to operate for a minimum operating time after restart; and
(d) a heater, operatively connected to said replacement water reservoir, to provide heat to the replacement water reservoir to melt sufficient water in said reservoir in less than said minimum operating time after restart, to replenish said electrolysis cell.

26. An internal combustion engine kit for producing ones or more gases for enhancing combustion in an internal combustion engine, said engine having an intake, the internal combustion engine kit comprising:
(a) an electrolysis cell, for generating one or more combustion enhancing gases under pressure;
(b) a power conditioning means, to provide appropriate electrical power to said electrolysis cell;
(c) a water reservoir, to provide water to said electrolysis cell, and a water conduit between said water reservoir and said cell;
(d) an electronic controller, for controlling the supply of electrical power to said electrolysis cell, so that said electrolysis cell can perform electrolysis, and for controlling the supply of water from the water reservoir to the electrolysis cell;
(e) a gas conduit, for connecting the electrolysis cell to the internal combustion engine;
(f) a pressure regulator, operatively connected between the electrolysis cell and the intake of the engine, for maintaining a positive pressure in said cell; and
(g) a pressure connection between said electrolysis cell and said reservoir wherein said positive pressure in said cell is communicated to said reservoir to drive said water from said reservoir into said cell to replenish said electrolytic solution in said cell.

27. The internal combustion engine kit according to claim 26, wherein said flow regulator is a pressure release valve set to a release pressure towards an upper end of an operating range of pressures of said intake.

28. The internal combustion engine kit according to claim 27 wherein said kit contains external connections to: a source of positive voltage, a source of negative voltage, an oil pressure switch, a water input, and a gas output.

* * * * *